(12) United States Patent
Inoki et al.

(10) Patent No.: US 11,153,919 B2
(45) Date of Patent: Oct. 19, 2021

(54) WIRELESS COMMUNICATION SYSTEM AND WIRELESS COMMUNICATION CONTROL METHOD

(71) Applicant: NIPPON TELEGRAPH AND TELEPHONE CORPORATION, Tokyo (JP)

(72) Inventors: Akiyoshi Inoki, Yokosuka (JP); Hirantha Abeysekera, Yokosuka (JP); Munehiro Matsui, Yokosuka (JP); Kenichi Kawamura, Yokosuka (JP); Yasushi Takatori, Yokosuka (JP); Takeo Ichikawa, Yokosuka (JP); Akira Kishida, Tokyo (JP); Yoshifumi Morihiro, Tokyo (JP); Takahiro Asai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 94 days.

(21) Appl. No.: 16/498,869

(22) PCT Filed: Mar. 28, 2018

(86) PCT No.: PCT/JP2018/012803
§ 371 (c)(1),
(2) Date: Sep. 27, 2019

(87) PCT Pub. No.: WO2018/181491
PCT Pub. Date: Oct. 4, 2018

(65) Prior Publication Data
US 2020/0053774 A1 Feb. 13, 2020

(30) Foreign Application Priority Data

Mar. 30, 2017 (JP) .............................. JP2017-067259

(51) Int. Cl.
*H04W 74/08* (2009.01)
*H04W 84/12* (2009.01)

(52) U.S. Cl.
CPC .......... *H04W 74/085* (2013.01); *H04W 84/12* (2013.01)

(58) Field of Classification Search
CPC ... H04W 4/40; H04W 72/04; H04W 36/0055; H04W 74/0833; H04W 28/0242; H04W 28/04; H04L 5/0048
See application file for complete search history.

(56) References Cited

U.S. PATENT DOCUMENTS

2007/0207738 A1   9/2007   Nakayama et al.
2009/0149133 A1   6/2009   Yoneyama
(Continued)

FOREIGN PATENT DOCUMENTS

JP   2007235533 A   9/2007
JP   2009117954 A   5/2009

OTHER PUBLICATIONS

Vasudevan, S. et al. "Facilitating Access Point Selection in IEEE 802.11 Wireless Networks", Usenix, The Advanced Computing Systems Association, pp. 1-6, XP061010331, retrieved on Oct. 24, 2005.

(Continued)

*Primary Examiner* — Iqbal Zaidi
(74) *Attorney, Agent, or Firm* — Harness, Dickey & Pierce, P.L.C.

(57) ABSTRACT

An AP and UE, which perform access control using CSMA/CA, perform a step judging an exposed level in transmission of the AP based on a congesting level in transmission, which is caused by a wireless station in defer transmission that is in a neighborhood of the AP; a step judging an exposed level in reception of the UE based on a congesting level in (Continued)

reception, which is caused by a wireless station in defer transmission that is in a neighborhood of the UE; and a step performing control which changes a channel of the AP, when the exposed level in transmission cannot satisfy expected quality of the AP, and performing control which changes a connected AP of the UE, or control which changes to other network, when the exposed level in transmission or in reception cannot satisfy required quality of the UE or the expected quality of the AP.

9 Claims, 12 Drawing Sheets

(56) References Cited

U.S. PATENT DOCUMENTS

| | | | | |
|---|---|---|---|---|
| 2010/0128705 | A1* | 5/2010 | Miyoshi | H04W 52/226 370/338 |
| 2012/0182867 | A1* | 7/2012 | Farrag | H04W 28/0236 370/230 |
| 2018/0115983 | A1* | 4/2018 | Harada | H04J 11/00 |

OTHER PUBLICATIONS

International Preliminary Report on Patentability regarding PCT/JP2018/012803, with English translation of the Written Opinion, dated Oct. 10, 2019.
"Part II: Wireless LAN Medium Access Control (MAC) and Physical Layer (PHY) Specifications", IEEE Std 802.11™—2016.
Gast, Matthew, "802.11 Wireless Networks: The Definitive Guide, Second Edition", translation supervised by Takashi Watanabe and Ryoji Ono, O-Reilly, Japan, Inc., 2006 (with partial translation).
Kozaki, Yoji and Nishii, Yoshitaka, "Learn Systematically Wi-Fi/3G/4G/LTE/WiMAX", Nikkei Business Publications, Inc., 2015, p. 241 (with partial translation).
NTT Technical Journal, "Practical Application of New HGW that Realizes High Functionality which Complies with the Latest Wireless Standard IEEE 802.11ac", Sep. 2015, p. 49 (with partial translation).
Inoki, Akiyoshi, et al,: "Hidden/Exposed terminal estimation method using Beacon for Wireless LANs", IEICE Technical Report, vol. 115, No. 496, pp. 31-36, Feb. 29, 2016 (with partial translation).
International Search Report (in English and Japanese) issued in PCT/JP2018/012803, dated May 15, 2018; ISA/JP.

* cited by examiner (1) exposed situation in transmission (2) exposed situation in reception (3) congesting situation in transmission/reception (1) the exposed level in AP transmission is low (2) the exposed level in AP transmission is high T : transmission F I G. 3
(1) the exposed level in UE reception is low
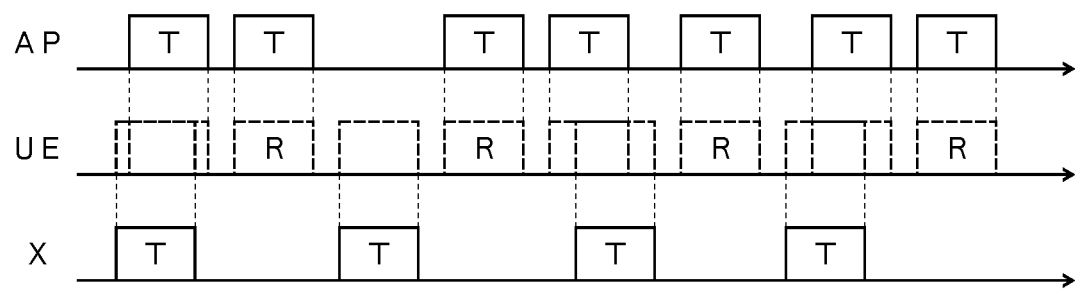
(2) the exposed level in UE reception is high
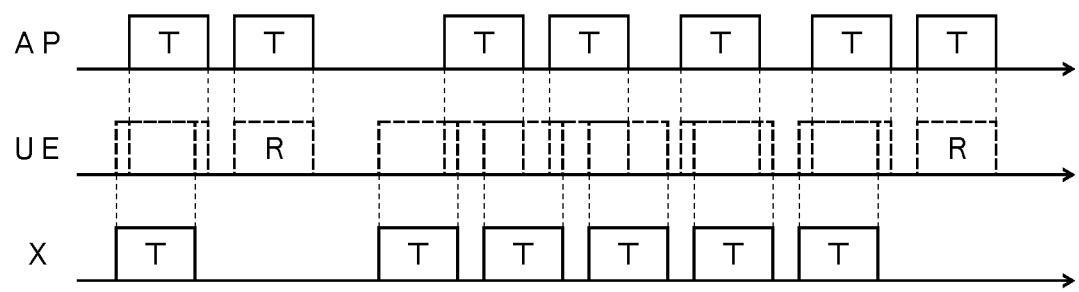
T : transmission
R : reception

WIRELESS COMMUNICATION SYSTEM AND WIRELESS COMMUNICATION CONTROL METHOD

CROSS-REFERENCE TO RELATED APPLICATION

This application is a U.S. National Phase Application claiming the benefit of prior filed International Application Number PCT/JP2018/012803, filed on Mar. 28, 2018, in which the International Application claims priority from Japanese Patent Application Number 2017-067259, filed on Mar. 30, 2017, the entire contents of which are incorporated herein by reference.

TECHNICAL FIELD

The present invention relates to a wireless communication system in which multiple wireless stations share the same wireless channel, and perform wireless communication using Carrier Sense Multiple Access/Collision Avoidance (CSMA/CA). Particularly, the present invention relates to a wireless communication system and a wireless communication control method, in each of which an exposed situation in transmission in which a transmission opportunity acquisition rate for a transmission station, which is caused by a wireless station that has a hidden-station relation, decreases, or an exposed situation in reception in which a normal reception rate for a reception station decreases, is judged, thereby avoiding an influence of a hidden station.

BACKGROUND ART

A wireless Local Area Network (LAN) system in compliance with the IEEE 802.11 standard, which is disclosed in Non-Patent Document 1, is improved yearly in throughput and is widely used as one principal wireless system. Because the wireless LAN system can use an unlicensed band that is a frequency band which does not require a license, various types of wireless stations are widely used. For wireless communication in this unlicensed band, random access control in compliance with CSMA/CA is performed, and because of this, a hidden-station problem and an exposed-station problem that cause a decrease in communication quality or system capacity is a larger obstacle. Among these, the hidden-station problem is a problem that occurs when transmission signals of wireless stations which do not mutually perform a carrier sensing function collide with each other, thereby making a throughput characteristic worse. As a method of solving the problem, for example, flow control that uses Request-To-Send (RTS)/Clear-To-Send (CTS) has been proposed. Regarding exchanging of an RTS frame and a CTS frame, even when a wireless signal from the transmission station, which cannot be detected, is present in the reception station, the reception station sets a NAV using the CTS frame in response to the RTS frame from the transmission station, and thus the hidden-station problem can be solved, thereby preventing a decrease in the communication quality or the system capacity.

When selecting an access point (AP) to which to make a connection or roaming from one area to another among APs, normally, user equipment (UE) that includes an interface for wireless LAN communication makes a determination of an AP that makes a connection based on a radio wave strength, a signal-to-noise ratio, a data rate, and the like (Non-Patent Document 2). Furthermore, the UE that, additionally, has an interface for cellular communication searches for a radio wave over a wireless LAN and a cellular network in this order, if a wireless LAN that is connectible is present, the UE automatically makes a connection to the wireless LAN, and, if not, the UE recognizes its own position as being outside of the wireless LAN area and performs an operation of connecting to the cellular network (Non-Patent Document 3).

Regarding channel setting for the AP on the wireless LAN, in addition to performing manual setting, an automatic wireless channel setting function of avoiding interference is provided, and automatic setting of an optimal channel is performed at the time of activation or periodically, based on the number of detected SSIDs (Non-Patent Document 4).

Non-Patent Document 1: IEEE Std 802.11™-2016, December 2016

Non-Patent Document 2: Authored by Matthew GAST, translation supervised by Takashi WATANABE and Ryoji ONO, "802.11 Wireless Networks: The Definitive Guide, Second Edition", O'Reilly Japan, Inc.

Non-Patent Document 3: Yoji KOZAKI and Yoshitaka NISHII, "Learn Systematically Wi-Fi/3G/4G/LTE/WiMAX", Nikkei Business Publications, Inc.

Non-Patent Document 4: "Practical Application of New HGW that Realizes High Functionality which Complies with the Latest Wireless Standard IEEE 802.11ac", NTT Technical Journal, September 2015

DISCLOSURE

Problems to be Solved

In a control method that uses RTS/CTS, at a point in time when the reception station receives an RTS frame, when a signal is receiving from any other wireless station, or a NAV is set, responding with the CTS frame destined for the transmission station is not possible. For that reason, an effect of solving the assumed hidden-station problem is not obtained. This case occurs in a dense environment where many APs operate on the same channel. Furthermore, the exposed-station problem occurs easily as well in the dense environment of the AP.

In a situation where the radio wave strength, the signal-to-noise ratio, or the data rate is high, the hidden-station problem and the exposed-station problem can occur as well. Therefore, in order to improve the communication quality or improve the system capacity, selection of the connected AP in the UE, which results from taking into consideration the hidden-station problem and the exposed-station problem, or switching a network to use from the wireless LAN to the cellular network is necessary.

Furthermore, when a radio wave environment in the AP changes, such as a new stationary AP or a mobile AP such as a mobile router appears, or when an influence such as a limitation on an available channel, which results from Dynamic Frequency Selection (DFS), is exerted, this change cannot be dealt with, only using the manual channel setting or the channel automatic setting at the time of activation of the AP. Furthermore, because the hidden-station problem and the exposed-station problem are possibly caused by the presence of the hidden stations that are stations which cannot mutually detect a signal, the hidden-station relation cannot be recognized with the number of SSIDs that are detected in the AP. Therefore, although the function of periodically performing the automatic setting of the channel is provided, because the hidden-station problem and the exposed-station problem cannot be recognized, the automatic setting does not function effectively. Alternatively, when communication is impossible for a fixed period after control is performed for providing a channel change, for example, when an influence of the DFS is exerted, in some cases, although the hidden-station problem or the hidden-station problem does not occur, the channel change is made, and, rather, the communication quality or the system capacity is decreased.

A proposition of the present invention is to provide a wireless communication system and a wireless communication control method, in each of which an AP and UE that perform access control which uses CSMA/CA judges an exposed situation in transmission of the AP and an exposed situation in reception of the UE that are due to an influence of a hidden station, and performs control that avoids the influence of the hidden station, based on a result of the judgment.

Means for Solving the Problems

According to a first embodiment, there is provided a wireless communication system in which an AP and UE, which perform access control using CSMA/CA, judge an exposed situation in transmission of the AP and an exposed situation in reception of the UE that are due to an influence of a hidden station, and perform control which avoids the influence of the hidden station, based on a result of the judgment, the system including a judgment section judging an exposed level in transmission of the AP which is based on a congesting level in transmission, which is caused by a wireless station in defer transmission that is in a neighborhood of the AP, and judging an exposed level in reception of the UE which is based on a congesting level in reception, which is caused by a wireless station in defer transmission that is in a neighborhood of the UE; and a control section performing control which changes a connected AP of the UE, or control which changes to other network, when the exposed level in transmission or the exposed level in reception cannot satisfy required quality of the UE.

In the wireless communication system according to the first embodiment, when the exposed level in transmission of the AP can satisfy the required quality of the UE and the exposed level in reception of the UE that is connected to the AP can satisfy the required quality of the UE, the control section is configured to perform control which sets the AP to be a connection destination.

According to a second embodiment, there is provided a wireless communication system in which an AP or UE, which performs access control using CSMA/CA, judges an exposed situation in transmission of the AP and an exposed situation in reception of the UE that are due to an influence of a hidden station, and performs control which avoids the influence of the hidden station, based on a result of the judgment, the system including a judgment section judging an exposed level in transmission of the AP which is based on a congesting level in transmission, which is caused by a wireless station in defer transmission that is in a neighborhood of the AP; and a control section performing control which changes a channel of the AP, when the exposed level in transmission cannot satisfy expected quality of the AP.

According to a third embodiment, there is provided a wireless communication system in which an AP or UE, which performs access control using CSMA/CA, judges an exposed situation in transmission of the AP and an exposed situation in reception of the UE that are due to an influence of a hidden station, and performs control which avoids the influence of the hidden station, based on a result of the judgment, the system including a judgment section judging an exposed level in reception of the UE which is based on a congesting level in reception, which is caused by a wireless station in defer transmission that is in a neighborhood of the UE; and a control section performing control which changes a connected AP of the UE, or control which changes to other network, when the exposed level in reception cannot satisfy expected quality of the AP.

According to a fourth embodiment, there is provided a wireless communication system in which an AP or UE, which performs access control using CSMA/CA, judges an exposed situation in transmission of the AP and an exposed situation in reception of the UE that are due to an influence of a hidden station, and performs control which avoids the influence of the hidden station, based on a result of the judgment, the system including a judgment section judging an exposed level in transmission of the AP which is based on a congesting level in transmission, which is caused by a wireless station in defer transmission that is in a neighborhood of the AP, and judging an exposed level in reception of the UE which is based on a congesting level in reception, which is caused by a wireless station in defer transmission that is in a neighborhood of the UE; and a control section performing control which changes a channel of the AP, when the exposed level in transmission cannot satisfy expected quality of the AP, and performing control which changes a connected AP of the UE, or control which changes to other network, when the exposed level in reception cannot satisfy the expected quality of the AP.

In the wireless communication system according to the first, second, and fourth embodiments, the judgment section is configured to judge the exposed level in reception of the UE, including the exposed level in transmission of the AP which is based on the congesting level in transmission of the AP.

In the wireless communication system according to the first and fourth embodiments, the judgment section is configured to make a judgment of the exposed level in transmission of the AP which is based on the congesting level in transmission, or a judgment of the exposed level in reception of the UE which is based on the congesting level in reception, using a result of aggregation obtained by aggregating an index in a prescribed period and using a judgment threshold.

In the wireless communication system according to the second embodiment, the judgment section is configured to make a judgment of the exposed level in transmission of the AP which is based on the congesting level in transmission, using a result of aggregation obtained by aggregating an index in a prescribed period and using a judgment threshold.

In the wireless communication system according to the third embodiment, the judgment section is configured to make a judgment of the exposed level in reception of the UE which is based on the congesting level in reception, using a result of aggregation obtained by aggregating an index in a prescribed period and using a judgment threshold.

According to a fifth embodiment, there is provided a wireless communication control method in which an access point (AP) and user equipment (UE), which perform access control using CSMA/CA, judge an exposed situation in transmission of the AP and an exposed situation in reception of the UE that are due to an influence of a hidden station, and perform control which avoids the influence of the hidden station, based on a result of the judgment, the method including a step judging an exposed level in transmission of the AP which is based on a congesting level in transmission, which is caused by a wireless station in defer transmission that is in a neighborhood of the AP; a step judging an exposed level in reception of the UE which is based on a congesting level in reception, which is caused by a wireless station in defer transmission that is in a neighborhood of the UE; and a step performing control which changes a channel of the AP, when the exposed level in transmission cannot satisfy expected quality of the AP, and performing control which changes a connected AP of the UE, or control which changes to other network, when the exposed level in transmission or the exposed level in reception cannot satisfy required quality of the UE or the expected quality of the AP.

Effect

According to the present invention, based on a result of an judgment of an exposed level in transmission that results from taking into consideration a congesting level in transmission, or an exposed level in reception that results from taking into consideration a congesting level in reception, UE's control that changes a network or a connected AP, or AP's control of channel change can be performed. As a result, an exposed situation in transmission of the AP and an exposed situation in reception of the UE can be solved, and maintenance of required quality of the UE or expected quality of the AP can be realized. Accordingly, an increase in a system capacity of a CSMA/CA network can be expected.

Furthermore, in judgment of the exposed level in transmission or the exposed level in reception, a likelihood of the congesting situation in transmission or a congesting situation in reception can be ruled out, and a judgment threshold and an aggregation period, which reflect the precision of judgment with respect to the time axis, can be set. As a result, unintended UE's control that changes the network or the connected AP or unintended AP's control of the channel change can be reduced.

Furthermore, for example, using a beacon signal, the control according to the present invention can be performed without extension of the standard specification. As a result, the control according to the present invention can be easily performed and can be realized without consuming a radio resource for the CSMA/CA network that is judged.

BRIEF DESCRIPTION OF DRAWINGS

FIG. 3 is a timing chart illustrating a situation where an exposed level in reception is high and a situation where the exposed level in reception is low.

DETAILED DESCRIPTION OF THE EMBODIMENTS

Figure 1:
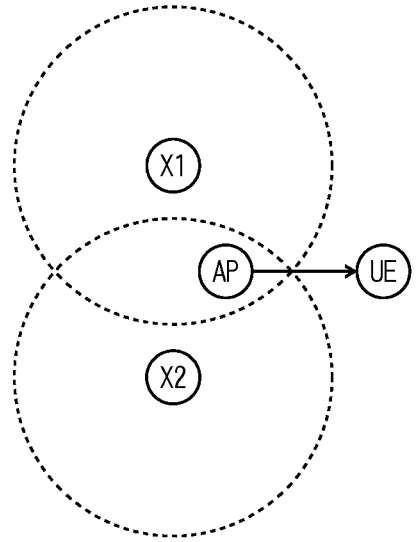
FIG. 1 is a diagram illustrating examples of exposed situations in transmission and reception and of congesting situations in transmission and reception.
Figure 1:
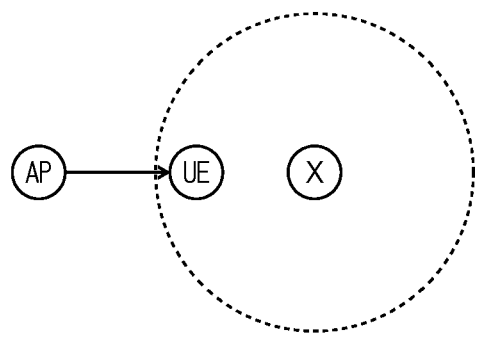
Figure 1:
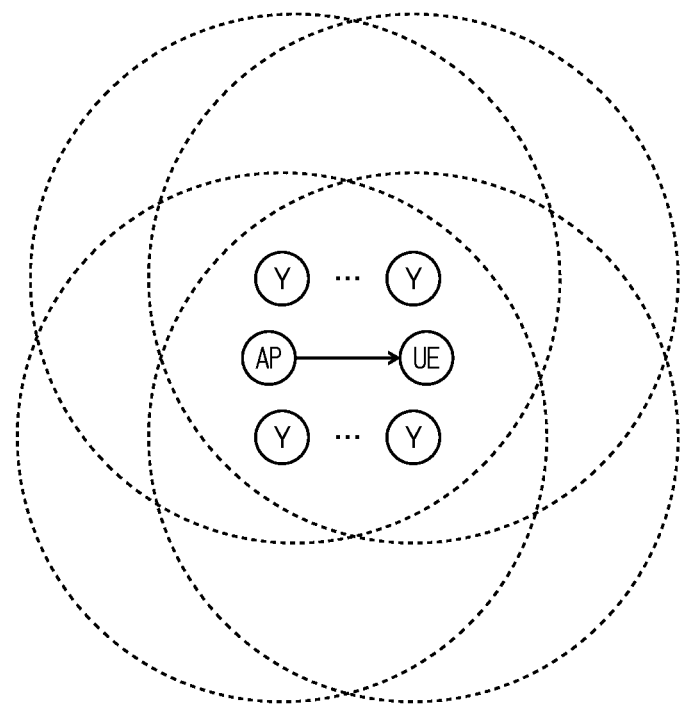

A feature of the present invention is that, in an AP and UE that perform access control which uses CSMA/CA, an "exposed situation" due to an influence of a hidden station is judged. At this time, the "exposed situation" that results from taking into consideration a "congesting situation" that is not due to the influence of the hidden station is judged with high precision. Then, changing of a channel in the AP, and changing of a network or the connected AP in the UE, and the like are performed based on a result of the judgment thereof in order to avoid the influence of the hidden station.

At this point, terms that will be used throughout the present specification are defined as follows.

Exposed Situation in Transmission: in a transmission station, a situation where a transmission opportunity acquisition rate is decreased due to the influence of the hidden station.

Exposed Level in Transmission: in the transmission station, a decreased level of the transmission opportunity acquisition rate due to the influence of the hidden station.

Exposed Situation in Reception: in a reception station, a situation where a normal reception rate of a signal from the transmission station is decreased due to the influence of the hidden station.

Exposed Level in Reception: in the reception station, a decreased level of the normal reception rate of the signal due to the influence of the hidden station.

Interfering Wireless Station: a wireless station that causes the exposed situation in transmission or the exposed situation in reception.

Congesting Situation: a situation where a transmission opportunity acquisition rate or a normal reception rate is decreased due to the presence of many wireless stations subject to defer transmission in the vicinity of the transmission station or the reception station, instead of the influence of the hidden station.

Wireless Station Subject to Defer Transmission: a wireless station that has to transmit a signal that is completely prepared for transmission and has a hope for transmission opportunity acquisition.

Congesting Situation in Transmission: in the transmission station, a situation where the transmission opportunity acquisition rate is decreased due to the influence of the number of wireless stations subject to defer transmission in the vicinity of the transmission station, instead of the influence of the hidden station. In the congesting situation in transmission, because multiple wireless stations have a hope for the transmission opportunity acquisition, the transmission opportunity acquisition rate is decreased.

Congesting Level in Transmission: in the transmission station, a decreased level of the transmission opportunity acquisition rate that results from an increase in the number of wireless stations subject to defer transmission in the vicinity of the transmission station, instead of the influence of the hidden station.

Congesting Situation in Reception: in the reception station, a situation where a normal reception rate of a signal is decreased due to the influence of the number of wireless stations subject to defer transmission in the vicinity of the wireless station, instead of the influence of the hidden station. In the congesting situation in reception, the normal reception rate is decreased by the collision due to the influence of concurrent transmission that occurs in CSMA/CA.

Congesting Level in Reception: in the reception station, a decreased level of the normal reception rate of a signal that results from the number of wireless stations subject to defer transmission in the vicinity of the reception station, instead of the influence of the hidden station.

Competitive Wireless Station: a wireless station that causes the congesting situation in transmission or the congesting situation in reception.

FIG. 1 illustrates examples of the exposed situations in transmission and reception and of the congesting situations in transmission and reception.

In FIG. 1, the AP is an access point for a wireless LAN, which is the transmission station, and the UE is a user station that corresponds to a wireless LAN and a cellular network, which is the reception station. X is an interfering wireless station with respect to the AP or the UE, and Y is a competitive wireless station with respect to the AP or the UE. A circle of which the center is the interfering wireless station X or the competitive wireless station Y indicates a range of arriving radio waves.

(1) of FIG. 1 illustrates that interfering wireless stations X1 and X2 which have a hidden-station relation with respect to each other are present, and that the AP that possibly receives signals of both the wireless stations are in the exposed situation in transmission. (2) of FIG. 1 illustrates that the AP and the interfering wireless station X which have the hidden-station relation with respect to each other are present, and that the UE that possibly receives a signal of the interfering wireless station X is in the exposed situation in reception. (3) of FIG. 1 illustrates that many competitive wireless stations Y are present in the vicinity of the AP and the UE, and that the AP is in the congesting situation in transmission and the UE is in the congesting situation in reception.

Figure 2:
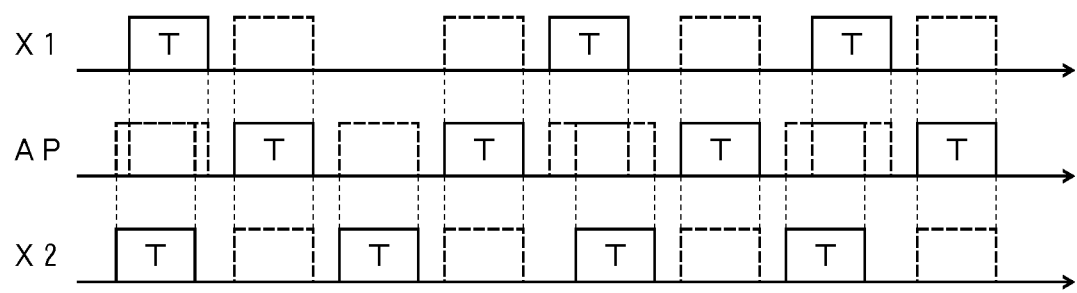
FIG. 2 is timing charts that show a situation where an exposed level in transmission is high and a situation where the exposed level in transmission is low, respectively.
Figure 2:
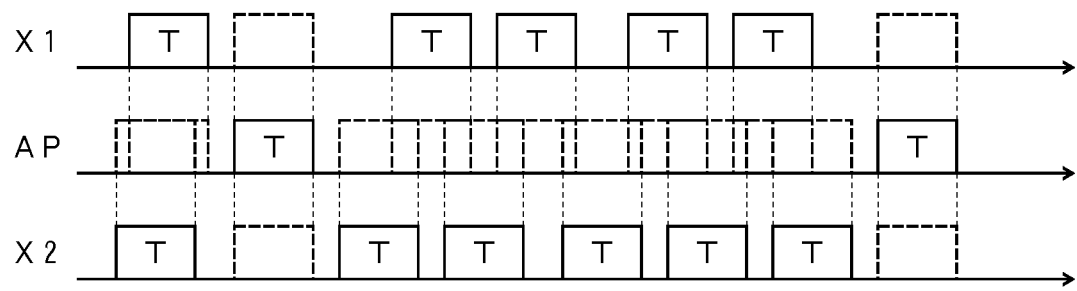

FIG. 2 illustrates a situation where the exposed level in transmission is high and a situation where the exposed level in transmission is low. At this point, the exposed situation in transmission that is illustrated in (1) of FIG. 1 is defined as a model.

In (1) of FIG. 2, when the number of transmission signals of the interfering wireless stations X1 and X2 is small, a decrease in the transmission opportunity acquisition rate in the AP is small, and the exposed level in transmission is small. In (2) of FIG. 2, when the number of transmission signals of the interfering wireless stations X1 and X2 is large, the decrease in the transmission opportunity acquisition rate in the AP is large, and the exposed level in transmission is high. Therefore, the higher frequencies of signal transmission of the interfering wireless stations X1 and X2 are, the higher the exposed level in transmission are. Besides, as causes of a change in the exposed level in transmission, the number of interfering wireless stations X, a transmission opportunity holding duration of the wireless station X and the AP itself, that is, a length of time from when a wireless station acquires a transmission opportunity one time to when transmission opportunity holding expires, and the like are given.

FIG. 3 illustrates a situation where the exposed level in reception is high and a situation where the exposed level in reception is low. At this point, the exposed situation in reception, which is illustrated in (2) of FIG. 1, is defined as a mode.

In (1) of FIG. 3, when the number of transmission signals of the interfering wireless station X is small, the decrease in the normal reception rate in the UE is small, and the exposed level in reception is low. In (2) of FIG. 3, when the number of transmission signals of the interfering wireless station X is small, the decrease in the normal reception rate in the UE is large, and the exposed level in reception is high. Therefore, the higher the frequency of the signal transmission of the interfering wireless station X is, the higher the exposed level in reception is. Besides, as the causes of the change in the exposed level in reception, the number of the interfering wireless stations X, the transmission opportunity holding duration of the AP for the interfering wireless station X and the UE, and the like are given.

In this manner, the exposed level in transmission and the exposed level in reception are difficult to represent in terms of mathematical expressions because not only the frequency of the signal transmission of the interfering wireless station X, but various elements are also involved. Furthermore, there is a need to judge the exposed level in transmission and the exposed level in reception that are distinguished from the congesting situation in transmission and the congesting situation in reception, respectively, that are caused by the competitive wireless station Y, which are illustrated in (3) of FIG. 1.

According to the present invention, in order to judge the exposed level in transmission in the AP and the exposed level in reception in the UE, it is assumed that a beacon signal in compliance with the IEEE 802.11 standard, which is transmitted voluntarily and periodically by the AP, is used. However, any signal that is transmitted periodically in the same manner as the beacon signal can be used, without limiting to the beacon signal. Furthermore, the beacon signal is transmitted by the AP and is received by the UE, but if the UE has a function of transmitting the beacon signal or a signal that is the same as the beacon signal, a relationship between the AP and the UE may be reversed. In any case, the beacon signal, as neither a special signal for control according to the present invention, nor a signal that burdens a radio resource of a CSMA/CA network, is described as an example.

A Time Stamp that is a transmission time is included in the beacon signal. Furthermore, the transmission time for transmission of the beacon signal is scheduled as a Target Beacon Transmission Time (TBTT), a delay time from the TBTT to the Time Stamp is defined as "beacon signal transmission delay". The exposed level in transmission in the AP is judged based on the beacon signal transmission delay of the beacon signal that is transmitted by the AP, but as a cause of the beacon signal transmission delay, the congesting level in transmission in the AP is also involved. Furthermore, when in the UE, the beacon signal that is at the TBTT cannot be normally received, this is referred to "beacon signal reception failure". Based on the beacon signal reception failure of the beacon signal that is received by the UE, the exposed level in reception in the UE is judged. However, as causes of the beacon signal reception failure, the congesting level in reception in the UE is also involved, and the beacon signal transmission failure in which, due to the beacon signal transmission delay in the AP, the beacon signal cannot be transmitted until the next TBTT is reached, that is, the exposed level in transmission, which results from taking into consideration the congesting level in transmission, is also involved.

Consequently, according to the present invention, as will be described below, a beacon signal transmission delay α in the AP is calculated, and a judgment is made of the exposed level in transmission in the AP, taking into consideration an influence of the congesting situation in transmission as well. It is noted that, using the TBTT of the beacon signal and the Time Stamp, it is also possible that the beacon signal transmission delay α is calculated in the UE, and because of this, it is also possible that, in the UE, a judgment is made of the exposed level in transmission in the AP. Furthermore, a beacon signal non-reception β' in the UE is calculated, a beacon signal transmission failure f(α) is estimated from a history of the beacon signal transmission delay α, a beacon signal reception failure β in the UE is calculated from β' and f(α), and an influence of the congesting situation in reception is also taken into consideration. Thus, a judgment is made of the exposed level in reception in the UE. Furthermore, in the AP, it is also possible that the beacon signal non-reception β' is acquired from the UE, that the beacon signal reception failure β is calculated from a relationship with the beacon signal transmission failure f(α), and that the exposed level in reception in the UE is judged.

(Wireless Communication System According to Embodiment 1 of the Present Invention)

Figure 4:
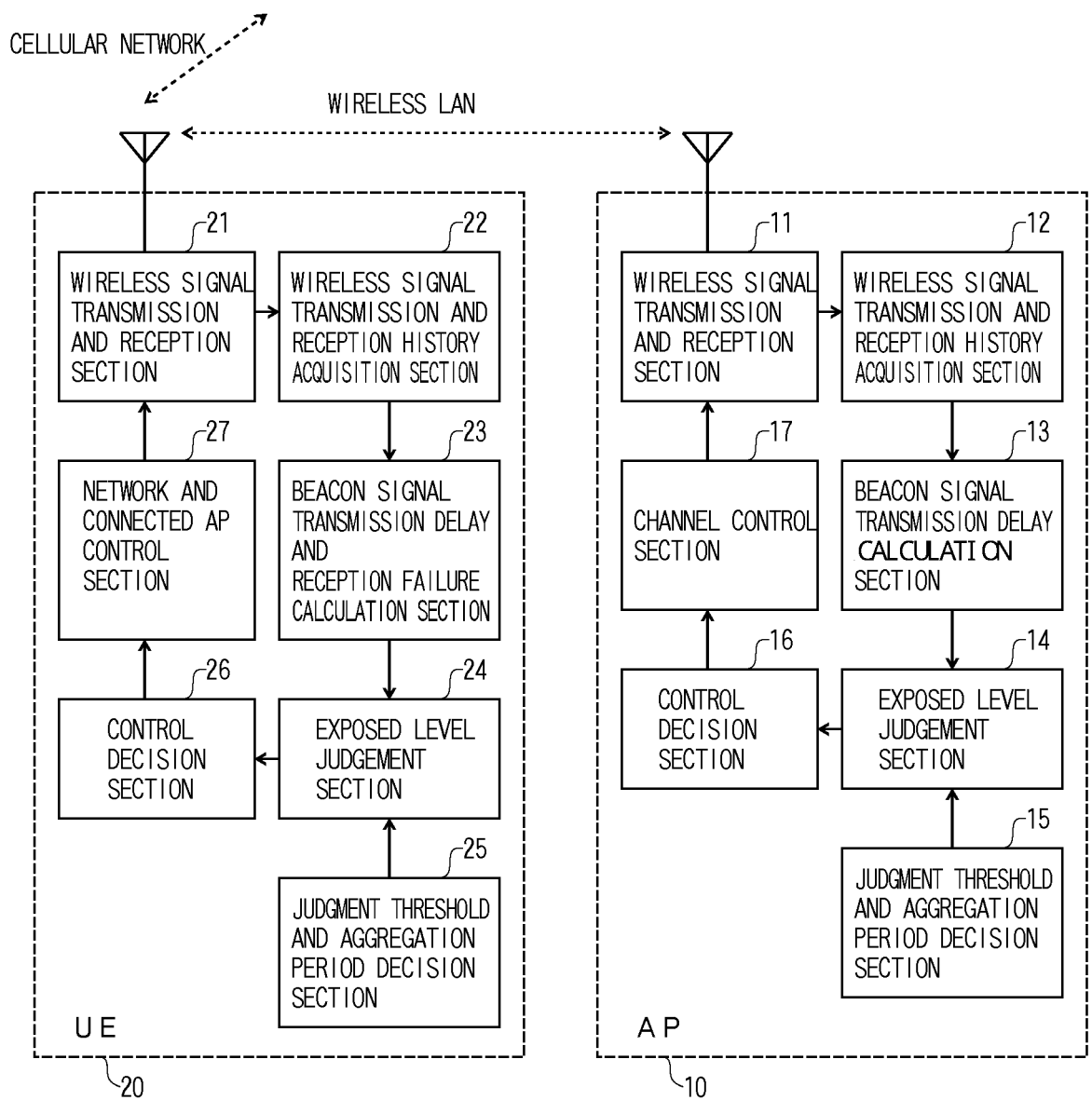
FIG. 4 is a block diagram illustrating a configuration of a wireless communication system according to Embodiment 1 of the present invention.

FIG. 4 illustrates a configuration of a wireless communication system according to Embodiment 1 of the present invention.

In FIG. 4, Example 1 of a configuration of the wireless communication system is configured with an AP 10 and UE 20. The AP 10 and the UE 20 include wireless signal transmission and reception sections 11 and 21 that transmit and receive wireless signals which are transferred based on a CSMA/CA scheme using a selected wireless channel, and wireless signal transmission and reception history acquisition sections 12 and 22 that accumulate transmission and reception histories of the wireless signals transmitted and received in the wireless signal transmission and reception sections, respectively. Transmission and reception histories of the beacon signals are accumulated here.

The AP 10 further includes a beacon signal transmission delay calculation section 13, an exposed level judgment section 14, a judgment threshold and aggregation period decision section 15, a control decision section 16, and a channel control section 17. The beacon signal transmission delay calculation section 13 calculates the beacon signal transmission delay α from a transmission history of the beacon signal, which is accumulated in the wireless signal transmission and reception history acquisition section 12. The exposed level judgment section 14 aggregates the beacon signal transmission delay α in an aggregation period T1 that is calculated in the judgment threshold and aggregation period decision section 15, compares a result of the aggregation thereof and a judgment threshold S that is calculated in the judgment threshold and aggregation period decision section 15, and judges whether or not a wireless channel that is set can satisfy expected quality of the AP 10. The control decision section 16 decides control that is to be performed, based on a result of the judgment in the exposed level judgment section 14. Based on the decision by the control decision section 16, the channel control section 17 instructs the wireless signal transmission and reception section 11 to change the wireless channel.

The UE 20 further includes a beacon signal transmission delay and reception failure calculation section 23, an exposed level judgment section 24, a judgment threshold and aggregation period decision section 25, a control decision section 26, and a network and connected AP control section 27. The beacon signal transmission delay and reception failure calculation section 23 calculates the beacon signal transmission delay α and the beacon signal reception failure β from a reception history of the beacon signal, which is accumulated in the wireless signal transmission and reception history acquisition section 22. The exposed level judgment section 24 aggregates the beacon signal transmission delay α and the beacon signal reception failure β in aggregation periods T1 and T2, respectively, that are calculated in the judgment threshold and aggregation period decision section 25, compares results of the aggregation thereof and judgment thresholds S and R, respectively, that are calculated in the judgment threshold and aggregation period decision section 25, and judges whether or not the wireless channel that is set can satisfy the expected quality of the AP 10 and required quality of the UE 20. The control decision section 26 decides control that is to be performed, based on a result of the judgment in the exposed level judgment section 24. Based on the decision by the control decision section 26, the network and connected AP control section 27 instructs the wireless signal transmission and reception section 21 to stop or resume the wireless channel that is set, or to change the network or the connected AP.

Based on pieces of information such as the expected quality of the AP 10, beacon signal transmission priority, the number of wireless stations subject to defer transmission, and the transmission opportunity holding duration, the judgment threshold and aggregation period decision section 15 calculates the judgment threshold S of the beacon signal transmission delay α, and the aggregation period T1 therefor, taking into consideration the precision of the judgment of the exposed level in transmission and the exposed level in reception. Based on pieces of information such as the required quality of the UE 20, the beacon signal transmission priority, the number of wireless stations subject to defer transmission, and the transmission opportunity holding duration, the judgment threshold and aggregation period decision section 25 calculates the judgment threshold R of the beacon signal reception failure 3, and the aggregation period T2 therefor, taking into consideration the precision of the judgment of the exposed level in transmission and the exposed level in reception. It is noted that it is also possible that the pieces of information, such as the beacon signal transmission priority, the number of wireless station subject to defer transmission, and the transmission opportunity holding duration are configured to be acquired from the wireless signal transmission and reception history acquisition sections 12 and 22.

At this point, the judgment threshold S is for judging whether or not the expected quality of the AP 10 can be satisfied at the exposed level in transmission that is based on the beacon signal transmission delay α. The judgment threshold R is for judging whether or not the required quality of the UE 20 can be satisfied at the exposed level in reception that is based on the beacon signal reception failure β. Furthermore, in CSMA/CA, collision avoidance is performed by using a random backoff time, and thus due to an influence of such randomness, variations in a transmission delay or a reception failure occur among one-by-one beacon signals. Because of this, the aggregation period T1 for the beacon signal transmission delay α and the aggregation period T2 for the beacon signal reception failure β are set, the beacon signal transmission delay α and the beacon signal reception failure β are aggregated, results of the aggregation thereof are compared with the judgment threshold S and the judgment threshold R, respectively, and results of the comparison are used for the judgment. It is noted that the judgment threshold S and the aggregation period T1, and the judgment threshold R and the aggregation period T2 need to be decided in terms of the expected quality of the AP 10 and the required quality of the UE 20, and of the precision that is required for the judgment. These decision methods will be described separately with reference to FIG. 11.

(Wireless Communication System According to Embodiment 2 of the Present Invention)

Figure 5:
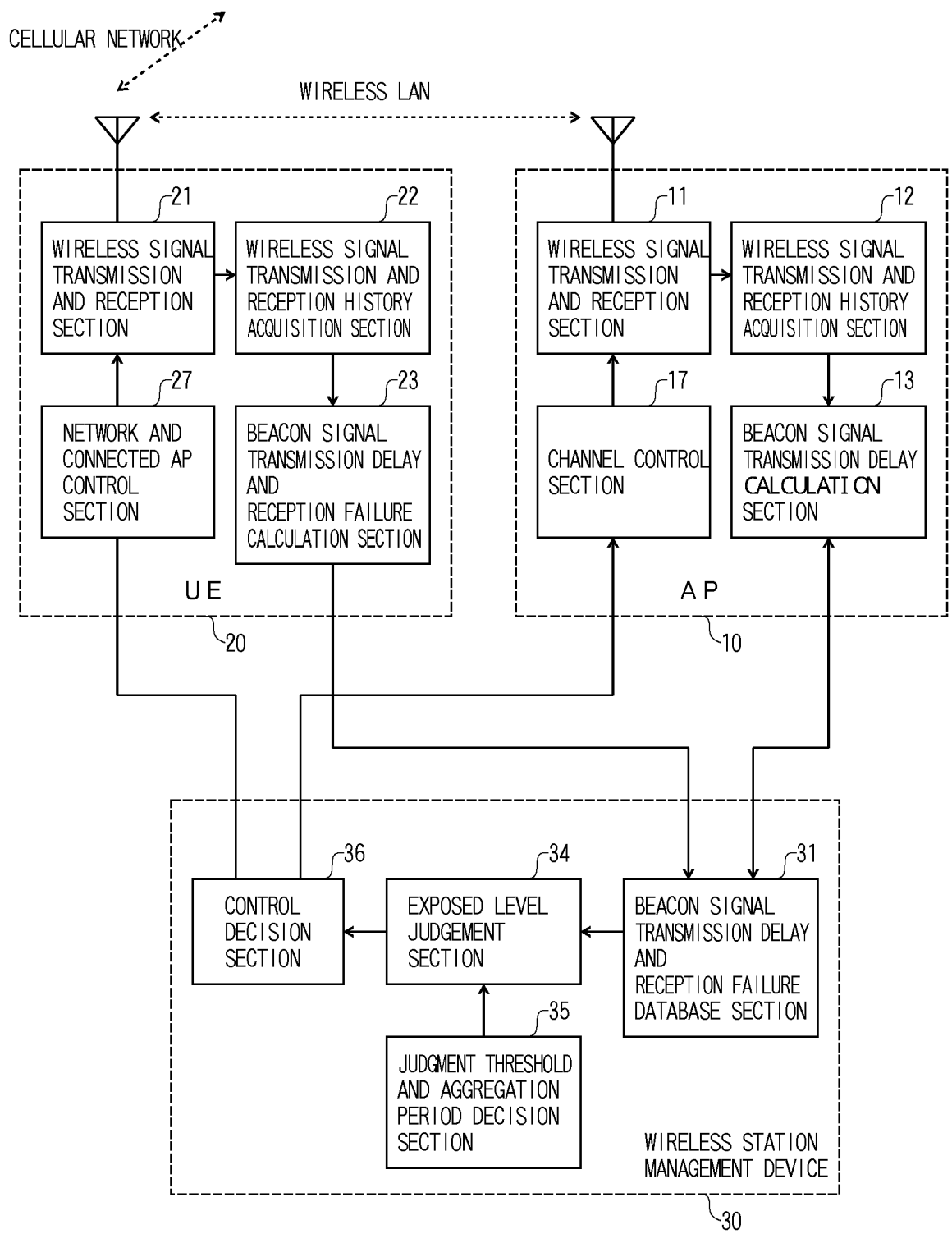
FIG. 5 is a block diagram illustrating a configuration of a wireless communication system according to Embodiment 2 of the present invention.

FIG. 5 illustrates a configuration of a wireless communication system according to Embodiment 2 of the present invention.

In FIG. 5, the wireless communication system according to Embodiment 2 includes a wireless station management device 30 that is connected both to the AP 10 and UE 20. It is noted that means for connection between them is omitted, but that either wireless means or wired means may be available. The wireless station management device 30 includes a beacon signal transmission delay and reception failure database section 31 that accumulates each piece of information that is calculated in the beacon signal transmission delay calculation section 13 of the AP 10 and the beacon signal transmission delay and reception failure calculation section 23 of the UE 20. Moreover, the wireless station management device 30 includes an exposed level judgment section 34, a judgment threshold and aggregation period decision section 35, and a control decision section 36, which are the same as the exposed level judgment section 14, the judgment threshold and aggregation period decision section 15, and the control decision section 16, which are included in the AP 10 according to Embodiment 1, and which are the same as the exposed level judgment section 24, the judgment threshold and aggregation period decision section 25, and the control decision section 26, which are included in the UE 20 according to Embodiment 1. The control decision section 36 performs control in cooperation with the channel control section 17 of the AP 10 and the network and connected AP control section 27 of the UE 20.

Figure 6:
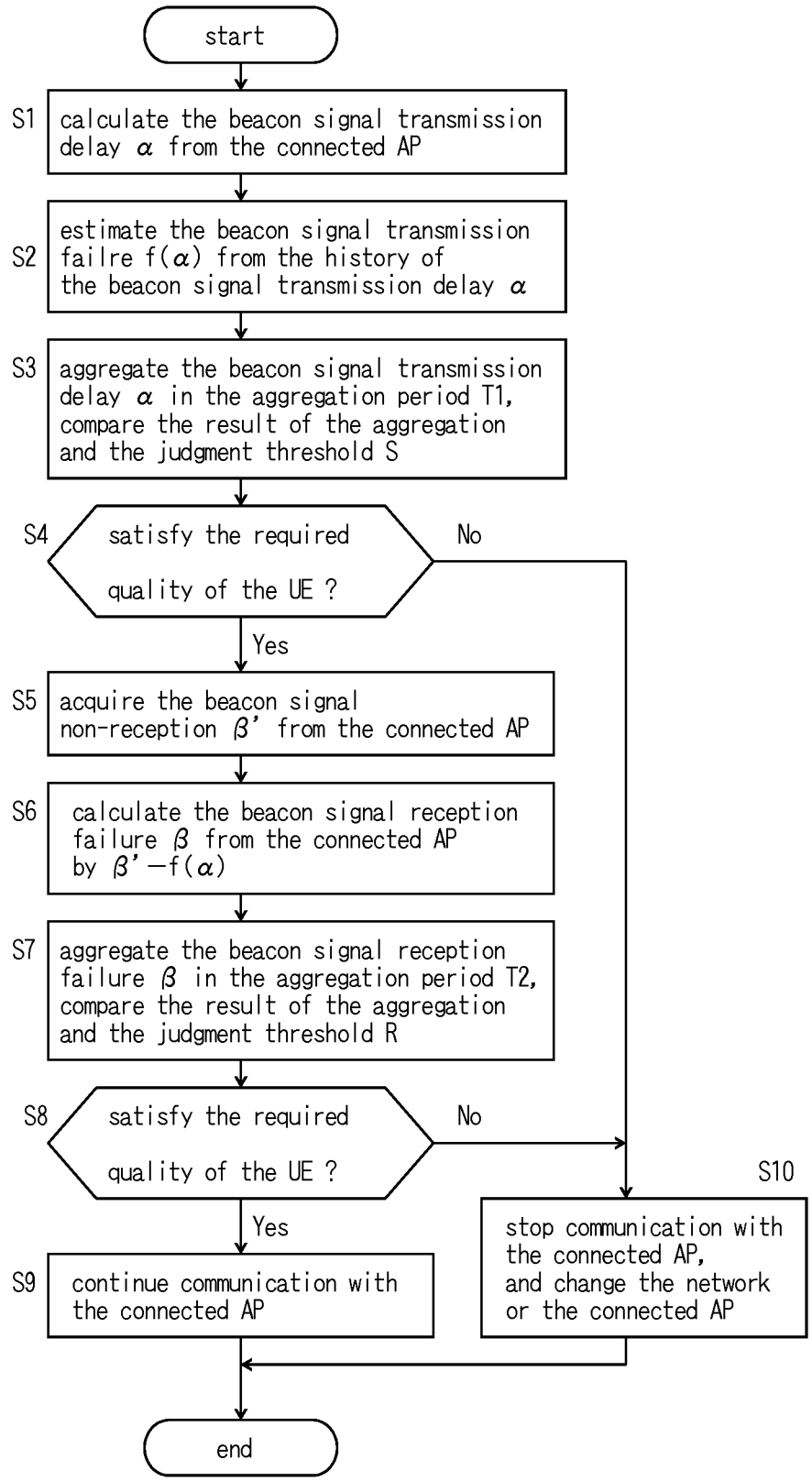
FIG. 6 is a flowchart illustrating Example 1 of a control procedure for UE, which is based on required quality of the UE.

Example 1 of a Control Procedure for the UE, which is Based on the Required Quality of the UE FIG. 6 illustrates Example 1 of a control procedure for the UE, which is based on the required quality of the UE. Note that it is assumed that the UE is already connected to the AP.

In FIG. 6, the UE calculates the beacon signal transmission delay α from the reception history of the beacon signal that is transmitted from the connected AP (S1). The beacon signal that is scheduled for transmission at the TBTT, although delayed according to a CSMA/CA procedure in the AP, is normally transmitted by the next TBTT Therefore, the TBTT is recognized in the UE, and thus the beacon signal transmission delay α can be calculated from the Time Stamp that is included in the received beacon signal. At this point, the beacon signal transmission failure $f(\alpha)$ in the AP keeps estimated from the history of the beacon signal transmission delay α (S2).

Next, the beacon signal transmission delay α is aggregated in the aggregation period T1, a result of the aggregation thereof and the judgment threshold S are compared (S3), and it is judged whether or not the result of the aggregation of the beacon signal transmission delay α can satisfy the required quality of the UE (S4). It is noted that, as the required qualities of the UE, throughput, latency, jitter, packet loss, and the like are given, and the exposed situation in transmission and the exposed situation in reception remarkably decrease these communication qualities. However, although the exposed situation in transmission and the exposed situation in reception are reached, when a quantity of radio resources that are used by the interfering wireless station that causes the situations is small, the exposed level in transmission and the exposed level in reception are low, and a decrease in the communication quality is small. Furthermore, although the exposed situation in transmission and the exposed situation in reception occur, if the required quality is low, this does not pose any problem. Based on these, the judgment threshold S is set.

When the result of the aggregation of the beacon signal transmission delay α can satisfy the required quality (YES in S4), in calculating the beacon signal reception failure β from the connected AP, the beacon signal non-reception β' that results when the beacon signal from the connected AP is not received by the next TBTT is first acquired (S5). However, the beacon signal has high priority for transmission, and thus normally, the beacon signal scheduled for transmission is transmitted actually. Because of this, the beacon signal non-reception β' and the beacon signal reception failure β are the same. However, when the exposed level in transmission in the AP is high, a beacon signal transmission failure may occur in which transmission is not performed by the next TBTT Thus, the beacon signal transmission failure $f(\alpha)$ that is estimated in Step S2 is subtracted from the beacon signal non-reception β', and thereby the beacon signal reception failure β from the connected AP is calculated (S6). The beacon signal transmission failure $f(\alpha)$ can be obtained using a table in which correspondence between the beacon signal transmission delay α and the beacon signal transmission failure $f(\alpha)$ is looked up, an equation into which the beacon signal transmission delay α is substituted for input and from which the beacon signal transmission failure $f(\alpha)$ is derived for output, or the like.

Next, the beacon signal reception failure β is aggregated in the aggregation period T2, a result of the aggregation thereof and the judgment threshold R are compared (S7), and it is judged whether or not the result of the aggregation of the beacon signal reception failure β can satisfy the required quality of the UE (S8). When the required quality of the UE can be satisfied, communication with the connected AP is continued (S9). It is noted that, in the judgment here, when a beacon signal reception failure rate over a fixed period is used, processing may be performed that, without performing estimation of the beacon signal transmission failure $f(\alpha)$ in Step S2, estimates a beacon signal transmission failure rate over the fixed period, and obtains and judges the beacon signal reception ratio over the fixed period by dividing a beacon signal non-reception rate over the fixed period by a result of subtracting the beacon signal transmission failure rate from 1. In this case, as is the case with the estimation of the beacon signal transmission failure $f(\alpha)$, the beacon signal transmission failure rate is obtained from the beacon signal transmission delay α as well, using the table or the equation.

However, when the exposed level in transmission is reached to such a degree that the AP can satisfy the required quality of the UE, if the beacon signal transmission failure can be disregarded, it is unnecessary to take f(α) into consideration.

When, by comparison between the result of the aggregation of the beacon signal transmission delay α in the connected AP and the judgment threshold S, it is judged that the exposed level in transmission cannot satisfy the required quality of the UE (No in S4), or when, by comparison between the result of the aggregation of the beacon signal reception failure β and the judgment threshold R, it is judged that the exposed level in reception cannot satisfy the required quality of the UE (No in S8), instruction to stop communication with the connected AP, or to change the network or the connected AP is provided (S10).

At this point, the processing procedure described above is an example of the processing procedure in which a judgment is made using only information that is obtained in the UE. As another example, when the AP calculates its own beacon signal transmission delay α or beacon signal transmission failure f(α), or the result of the aggregation thereof and where the result of the aggregation is transmitted in a state of being superimposed on the beacon signal, when the UE can access these pieces of information using a network other than the CSMA/CA network, or in other cases, the UE can omit the calculation of the beacon signal transmission delay α and the estimation of the beacon signal transmission failure f(α).

Regarding the present control procedure, when it is determined that the CSMA/CA network satisfies the required quality of the UE, because control that changes the network or the connected AP is not performed, it is possible that the present control procedure is performed continuously in a residing state. Furthermore, except for a case where the UE access information, that is, the beacon signal transmission delay α or the beacon signal transmission failure f(α), or the result of the accumulation thereof using a network other than the CSMA/CA network, because the realization can be feasible only with an observation of the beacon signal that is transmitted voluntarily by the AP, the performing is possible without applying a load to the CSMA/CA network or a different network.

It is noted that, in the control that changes the network or the connected AP, when use of the CSMA/CA network is stopped, and a state where the AP and the UE are connected to each other is maintained, an observation is also continuously made of the beacon signal in the UE, and that, when it is determined that quality of the CSMA/CA network satisfies the communication quality, the use can be immediately resumed.

Furthermore, the required quality of the UE may be set to be a required quality of each application that is used by the UE. In this case, when multiple applications are present in the UE and have different required qualities, control is possible in such a manner that only an application of which the quality of the CSMA/CA network falls below a required quality is stopped from using the CSMA/CA network and uses a different network, and that an application which satisfies the required condition makes a connection and uses the CSMA/CA network.

Figure 7:
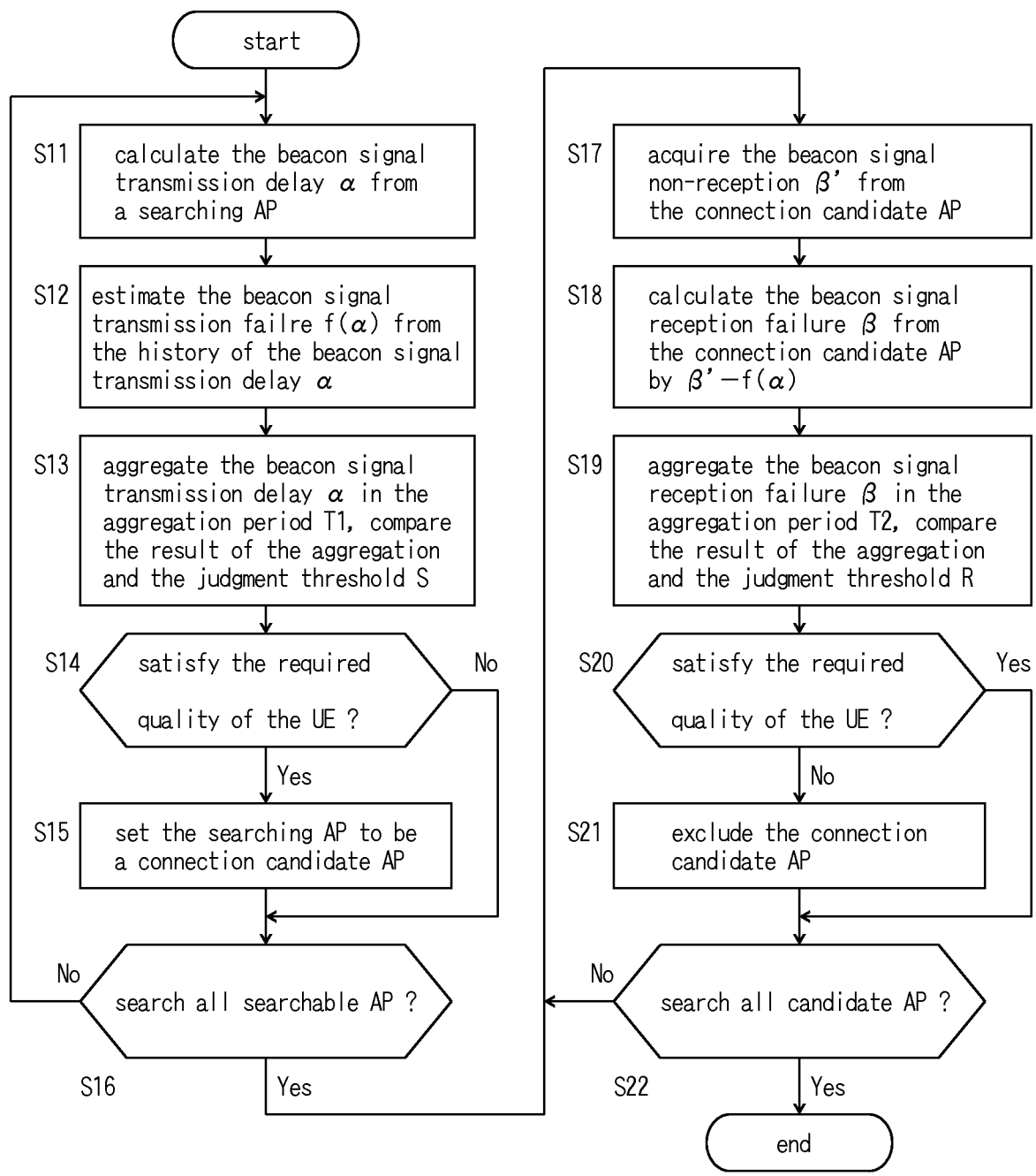
FIG. 7 is a flowchart illustrating Example 2 of the control procedure for deciding a connected AP of the UE, which is based on the required quality of the UE.

Example 2 of the Control Procedure for Determining the Connected AP of the UE, which is Based on the Required Quality of the UE FIG. 7 illustrates Example 2 of the control procedure for determining the connected AP of the UE, which is based on the required quality of the UE. At this point, when the UE is not connected to the AP, when a roaming procedure for make a connection to a new AP is started, when instruction to change the network or the connected AP is received in Example 1 of the control procedure, or in other cases, a procedure for searching for a new AP that satisfies the required quality is described.

In the same manner as in Example 1 of the control procedure, the judgment threshold S is set against which it is judged whether or not the exposed level in transmission that is based on the beacon signal transmission delay α can satisfy the required quality, and the judgment threshold R is set against which it is judged whether or not the exposed level in reception that is based on the beacon signal reception failure β can satisfy the required quality.

At this point, in deciding the aggregation periods T1 and T2 of the beacon signal transmission delay α and the beacon signal reception failure β, there is a need to take into consideration time that can be allowed for search. A limitation is imposed on the number of channels over which the UE can receive signals at the same time. When a search is conducted for an AP that is present on multiple channels, the UE needs to temporally switch to a channel that is observed and to detect the beacon signal from the AP, and it takes time to complete a search. Furthermore, when a connection is not made to the AP, the UE cannot perform communication with an interface that is used for the observation. Thus, in order to increase a utilization rate of the CSMA/CA network, there is a need to shorten the aggregation periods T1 and T2. On the other hand, the shortening of the aggregation periods T1 and T2 decreases the precision of the judgment. Therefore, the aggregation periods T1 and T2 need to be decided, taking into consideration a trade-off for both.

In FIG. 7, the UE calculates the beacon signal transmission delay α from the reception history of the beacon signal that is transmitted from the AP that is found (S11). At this point, the beacon signal transmission failure f(α) in the AP that is found keeps estimated from the history of the beacon signal transmission delay α (S12).

Next, the beacon signal transmission delay α is aggregated in the aggregation period T1, a result of the aggregation thereof and the judgment threshold S are compared (S13), and it is determined whether or not the result of the aggregation of the beacon signal transmission delay α can satisfy the required quality of the UE (S14). When the result of the aggregation (the exposed level in transmission) of the beacon signal transmission delay α is that the required quality can be "satisfied" (Yes in S14), the AP that is found is set to be a connection candidate for connection (S15). On the other hand, when the exposed level in transmission cannot satisfy the required quality (No in S14), the AP may not be set to be the connection candidate. As described above, processing operations in Steps S11 to S15 are repeated until the APs that are possibly found as a result of conducting a search are all found (S16).

After the APs that are possibly found as a result of conducting a search are all found, the beacon signal non-reception β' from the AP that is the connection candidate is acquired (S17). Thus, the beacon signal transmission failure f(α) that is estimated in Step S12 is subtracted from the beacon signal non-reception β', and thereby the beacon signal reception failure β from the AP that is the connection candidate is calculated (S18).

Next, the beacon signal reception failure β is aggregated in the aggregation period T2, a result of the aggregation thereof and the judgment threshold R are compared (S19), and it is judged whether or not the result of the aggregation of the beacon signal reception failure β can satisfy the required quality of the UE (S20). When the required quality of the UE cannot be satisfied, the AP that is the connection candidate is not included in candidates (S21). As described above, processing operations in Steps S17 to S21 are repeated until the APs that are the connection candidates are all found as a result of conducting a search (S22).

At this point, the processing procedure described above is an example of the processing procedure in which a judgment is made using only information that is obtained in the UE. As another example, when the AP calculates its own beacon signal transmission delay α or beacon signal transmission failure f(α), or the result of the aggregation thereof and where the result of the aggregation is transmitted in a state of being superimposed on the beacon signal, when the UE can access these pieces of information using a network other than the CSMA/CA network, or in other cases, the UE can omit the calculation of the beacon signal transmission delay α and the estimation of the beacon signal transmission failure f(α).

It is noted that, regarding which AP of the obtained APs that are the connection candidates has to be selected, any method, such as one that performs combinedly techniques which use a radio wave strength or channel utilization rate of the AP, the number of terminals connected to the AP, or the like, may be employed without causing any problem. Furthermore, when the AP that is the connection candidate is not present, it is possible that a different network is used for communication without using the CSMA/CA network.

In the related art, the UE makes a connection to the AP that has a maximum received signal strength indicator, among APs that are possibly found as a result of conducting a search. However, in the present control procedure, a connection is made to the AP that can satisfy the required quality of the UE, based on the beacon signal transmission delay α and the beacon signal reception failure β, and when the AP that is the connection candidate, which can satisfy the required quality of the UE is not present, a different network is used. At this point, a result of aggregation in a throughput measurement experiment for checking such a difference is shown. In the present experiment, the AP and the UE that comply with IEEE 802.11ac were used. 6 APs that used the same channel and one piece of UE in the vicinity of each of the APs were installed on the same floor, a connection was made to the AP, and full buffer traffic in downlink from the AP to the UE occurred. Regarding the UE that was a target for throughput measurement, an AP that made a connection using a scheme in the related art and a scheme in Example 2 of the control procedure, which was among the 6 APs, was decided. Thereafter, a downlink throughput measurement was made at 41 points, as multiple throughput measurement points on the floor, that were spaced at approximately equal distances. It is noted that a place of installation of the AP was decided in such a manner that, at all measurement points, the UE that was the target for throughput measurement could receive a signal with a sufficient radio wave strength in order to perform communication from one or more APs.

In the scheme in the related art, connections to a wireless LAN network that did not satisfy the required quality of the UE, such as less than 1 Mbit/s, and connections to a wireless LAN network that satisfies the required quality of the UE, such as 1 Mbit/s or higher are made on an approximately fifty-fifty basis. On the other hand, in the present embodiment, connections were made to the LAN network that satisfied the required quality of the UE, such as 1 Mbit/s or higher, without selecting the wireless LAN network that did not satisfy the required quality of the UE, such as less than 1 Mbit/s (73%), but, when the wireless LAN network that satisfied the required quality of the UE, such as 1 Mbit/s or higher, was not present, control (27%) that made a connection to a different network (a cellular network) was performed.

Example 3 of the Control Procedure for the AP, which is Based on the Expected Quality of the AP The AP can change a channel that is to be used for communication. Therefore, when the AP itself is in the exposed situation in transmission, in some cases, the exposed situation in transmission can be avoided by changing a channel. However, although the exposed situation in transmission is entered, when the exposed level in transmission is low and the expected quality of the AP is ensured, there is no need to perform channel control. It is noted that as the expected qualities of the AP, in the same manner as in Example 1 of the control procedure, throughput, latency, jitter, packet loss, and the like are given.

Figure 8:
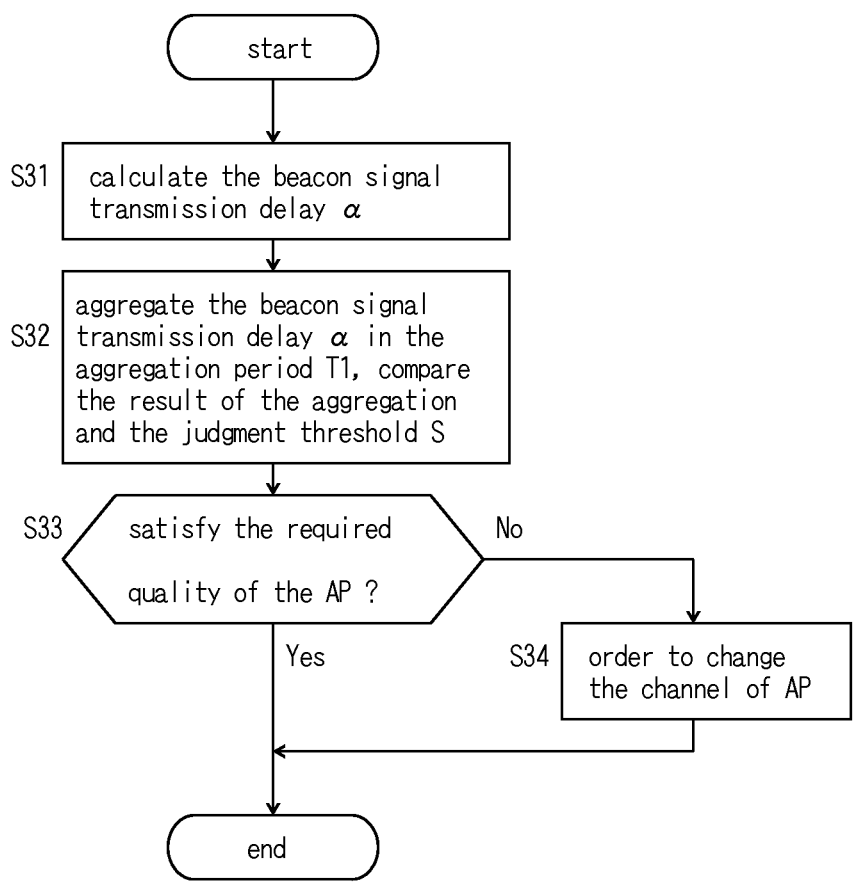
FIG. 8 is a flowchart illustrating Example 3 of the control procedure for the AP, which is based on expected quality of the AP.

FIG. 8 illustrates Example 3 of the control procedure for the AP, which is based on the expected quality of the AP.

In FIG. 8, the AP calculates the beacon signal transmission delay α from the transmission history of the transmitted beacon signal (S31). It is noted that the AP itself may acquire the beacon signal transmission delay α in the AP and may acquire the beacon signal transmission delay α from the UE that makes a calculation of the beacon signal transmission delay α as in the Examples 1 and 2 of the control procedure. Therefore, although the AP does not correspond to acquisition of the beacon signal transmission delay, it is possible that the control procedure is executed.

Next, the beacon signal transmission delay α is aggregated in the aggregation period T1, a result of the aggregation thereof and the judgment threshold S are compared (S32), and it is judged whether or not the result of the aggregation of the beacon signal transmission delay α can satisfy the expected quality of the AP (S33). When the result (the exposed level in transmission) of the aggregation of the beacon signal transmission delay α can satisfy the expected quality (Yes in S33), a channel that is to be used for communication is maintained. On the other hand, when the exposed level in transmission cannot satisfy the expected quality (No in S33), instruction to change a channel for the AP is provided (S34).

As an example of the channel control that is performed, a channel other than a primary channel over which the beacon signal is transmitted before the control is performed may be set to be a post-control primary channel. In any other condition, any method, such as one that performs combinedly existing techniques which use the number of detected SSIDs or the like, may be employed without causing any problem.

Incidentally, because the channel control by the AP exerts an influence on a channel environment in a system, a hidden station relationship occurs, and thus there is a likelihood that a new exposed situation in transmission and exposed situation in reception will be brought about. Furthermore, when multiple APs in the system perform the channel control at the same time, the hidden station relationship that provides a basis for the channel control collapses, and in some cases, the channel control is meaningless. Furthermore, because the hidden station relationship means that signals cannot be detected mutually, only by using information on one AP or the UE that is connected to the one AP, the hidden station relationship cannot be recognized entirely. Therefore, the channel controls by multiple APs in the system are managed in the wireless station management device 30 that is illustrated in FIG. 5, and the control is performed such that the APs sequentially perform control, starting from the AP having the highest exposed level in transmission, or, by limiting the number of APs that perform the channel control at a time, and the APs perform control, such as selecting, starting from the AP having the highest exposed level in transmission. Thus, an improvement in efficiency is expected.

Example 4 of the Control Procedure for the UE, which is Based on the Expected Quality of the AP In a state where the AP is connected to the UE in the exposed situation in reception, when a unicast signal is transmitted to the UE, there is a likelihood that reception fail will occur in the UE. The transmission of the unicast signal that results in reception failure wastes a radio resource that has a likelihood of being able to be effectively utilized when it comes to different UE that is connected to the AP, or any other AP or UE that is present in a range of arriving signals of the AP. However, although the connected UE is in the exposed situation in reception, when the exposed level in reception is low and the expected quality of the AP is ensured, there is no need to perform the control that changes the network or the connected AP.

Figure 9:
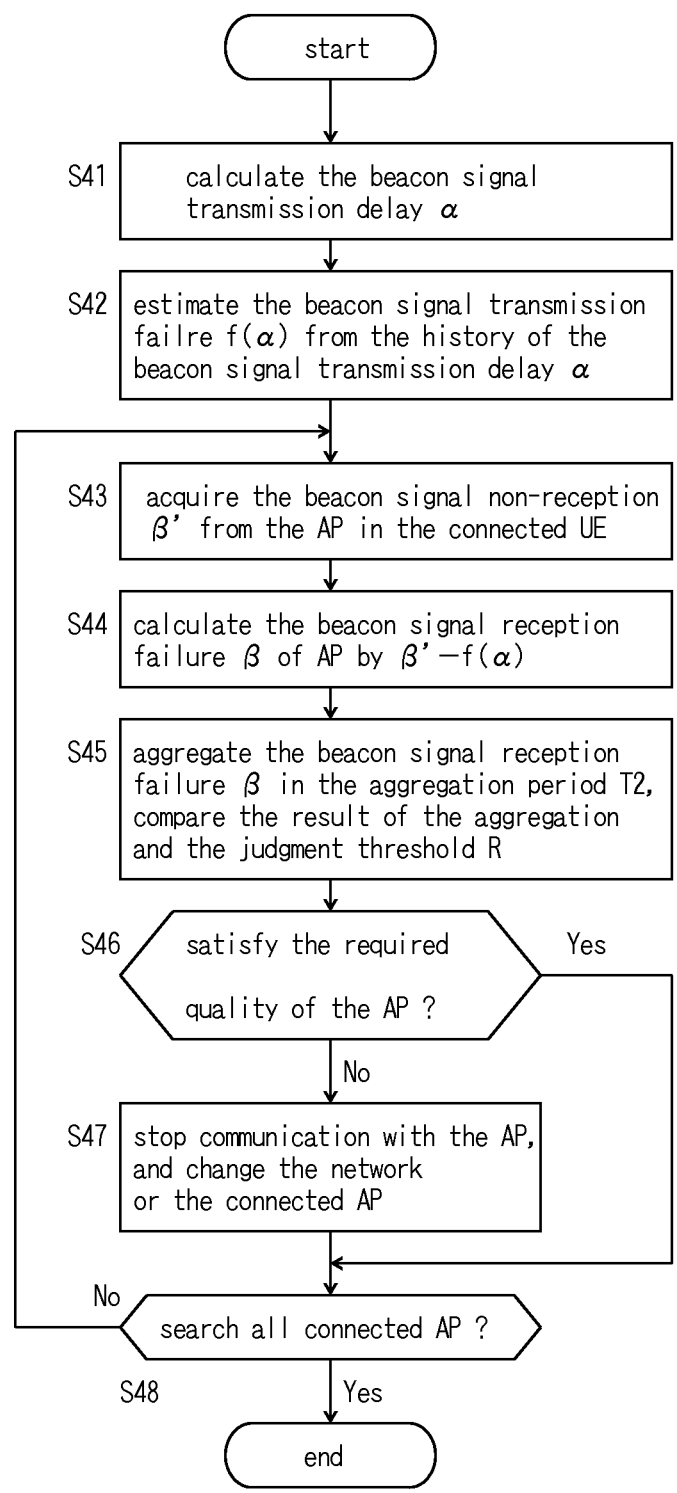
FIG. 9 is a flowchart illustrating Example 4 of the control procedure for the UE, which is based on the expected quality of the AP.

FIG. 9 illustrates Example 4 of the control procedure for the UE, which is based on the expected quality of the AP.

In FIG. 9, the AP calculates the beacon signal transmission delay α from the transmission history of the transmitted beacon signal (S41). At this point, the beacon signal transmission failure f(α) in the AP that is found keeps estimated from the history of the beacon signal transmission delay α (S42).

Next, the beacon signal non-reception β' from the AP in the connected UE is acquired (S43). The beacon signal transmission failure f(α) estimated in Step S42 is subtracted from the beacon signal non-reception β' and thereby the beacon signal reception failure β from the AP is calculated (S44). Next, the beacon signal reception failure β is aggregated in the aggregation period T2, a result of the aggregation thereof and the judgment threshold R are compared (S45), and it is judged whether or not the result of the aggregation of the beacon signal reception failure β can satisfy the expected quality of the AP (S46). When the expected quality of the AP cannot be satisfied (No in S46), that is, when it is judged that the exposed level in reception in the UE cannot satisfy the expected quality of the AP, the instruction to stop the communication with the AP, or to change the network or the connected AP is provided (S47). As described above, processing operations in Steps S43 to S47 are repeated until all connected UEs are found as a result of conducting a search (S48).

It is noted that there is a need for information on the UE for the judgment described above. Therefore, in the example of the present control procedure, any one of the following processing operations is performed.

(1) The AP or the wireless station management device 30 in FIG. 5 acquires data relating to the beacon signal reception failure β or the result of the aggregation thereof from each UE, and determines the change of the network or the connected AP each UE.

(2) Information relating to the expected quality of the AP and information necessary for the judgment of the change of the network or the connected AP keep shared with the UE, and the UE itself determines the change of the network or the connected AP.

At this point, with reference to (2), a determination that is based on the expected quality of the AP may be made in conjunction with a judgment of the change of the network or the connected AP, in a method in Example 1 of the control procedure.

Incidentally, in the example of the present control procedure, as described above, because a setting is provided taking into consideration an influence on a different AP or UE, for example, when the UE that performs transmission and reception of data signal in the AP is not present in another AP, or when any other AP or UE in the neighborhood does not perform the transmission and reception of the data signal, the influence is not exerted. Therefore, when it is judged that there is no likelihood that the influence will be exerted, it is also possible that the present control procedure is not executed. Whether or not there is a likelihood that the influence will be exerted is determined from a transmission and reception history between the AP and the connected UE, and a reception history of a signal from an AP and UE that do not have a connection relationship with the AP, which are present in a transmission and reception history of the AP. These pieces of information are transmitted in a state of being superimposed onto the beacon signal that is transmitted by the AP, or the UE accesses the pieces of information using a different network, and thus acquisition by single UE is also possible.

Figure 10:
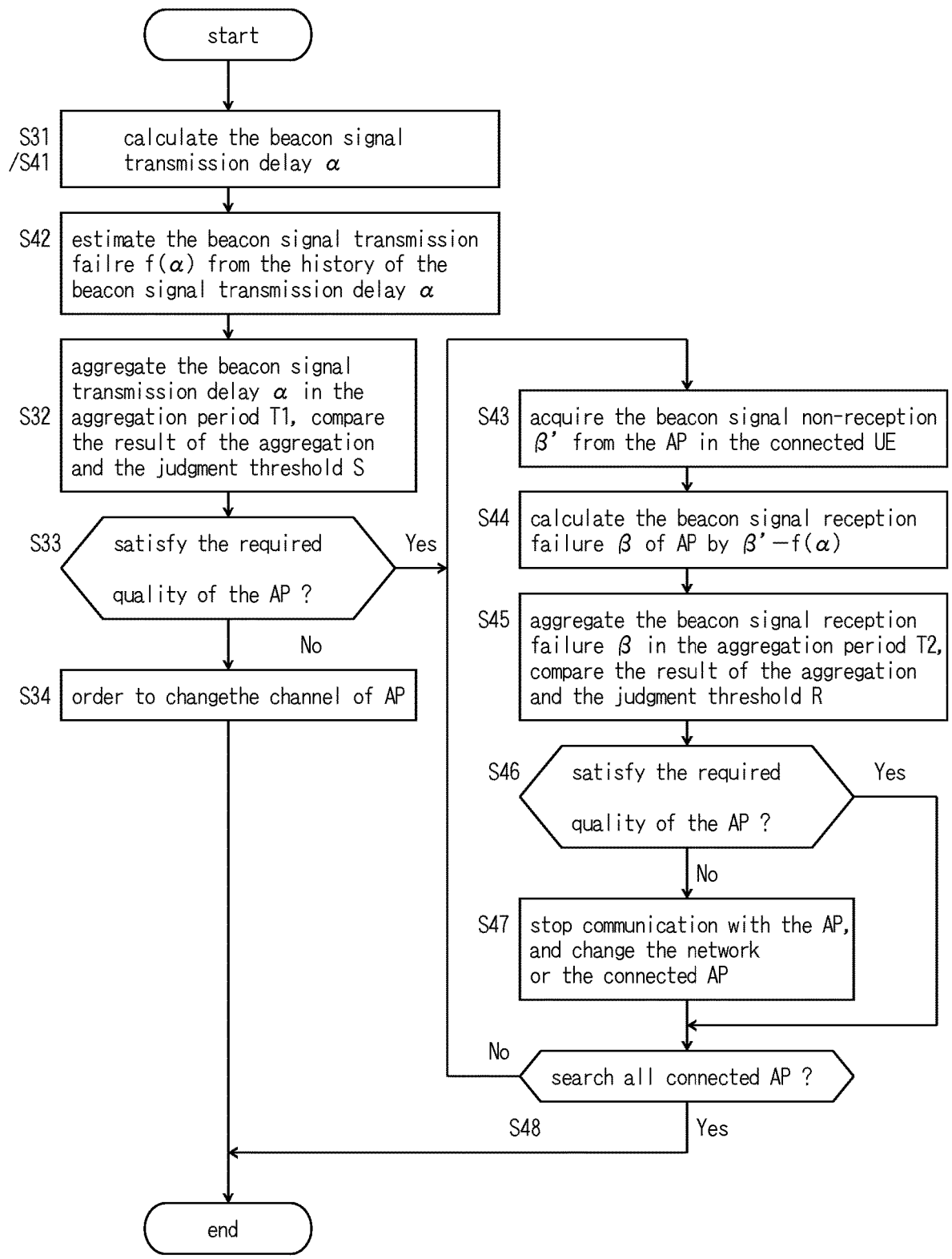
FIG. 10 is a flowchart illustrating Example 5 of the control procedure for the AP and the UE, which is based on the expected quality of the AP.

Example 5 of the Control Procedure for the AP and the UE, which is Based on the Expected Quality of the AP FIG. 10 illustrates Example 5 of the control procedure for the AP and the UE, which is based on the expected equality of the AP.

Example 5 of the present control procedure results from combining Example 3 of the control procedure of the AP, which is based on the expected quality of the AP that is illustrated in FIG. 8 and Example 4 of the control procedure for the UE, which is based on the expected quality of the AP that is illustrated in FIG. 9, and a corresponding step is given the same reference numeral.

When the channel for the AP changes, the hidden station relationship relating to the UE that is connected to the AP changes. Therefore, when Example 3 of the control procedure for the AP and Example 4 of the control procedure for the UE are operated independently of each other, with the channel change for the AP, the hidden station relationship itself that provides a basis for the change of the network and the connected AP in the UE, collapses, and there is a likelihood that the UE's control that changes the network or the connected AP t will be a wasteful control. From this, it follows that Example 3 of the control procedure for the AP and Example 4 of the control procedure for the UE are integrated, and only the UE of which the connected AP that is not a target for channel control is set to be a target for the control that changes the network or the connected AP (S33→S43).

In the example of the present control procedure, any one of the following processing operations is performed.

(1) The AP acquires the beacon signal reception failure β or data relating to the result of the aggregation thereof from the UE, or the wireless station management device 30 acquires the beacon signal reception failure β or data relating to the result of the aggregation thereof from the UE and the beacon signal transmission delay α or data relating to the result of the aggregation thereof from the AP, and determines the AP's performing of the channel control and the UE's control that changes the network or the connected AP.

(2) The information relating to the expected quality of the AP and information necessary for determination of the channel control by the AP and the control by the UE of the change of the network or the connected AP keep shared with the UE, and the UE judges not only the determination of the control that changes the network or the connected AP, but also the channel control by the connected AP.

At this point, with reference to (2), the determination that is based on the expected quality of the AP may be made in conjunction with the judgment of the change of the network or the connected AP, in the method in Example 1 of the control procedure.

It is noted that when Example 5 of the control procedure is employed, Example 3 of the control procedure or Example 4 of the control procedure may also be executed together.

(Example of a Procedure for Calculating the Judgment Thresholds S and R and the Aggregation Periods T1 and T2)

The beacon signal transmission delay α changes not only with the exposed level in transmission, but also with the congesting level in transmission. Furthermore, the beacon signal reception failure β changes not only with the exposed level in reception, but also with the congesting level in reception. When judging the congesting situation in transmission as the exposed situation in transmission or when judging the congesting situation in reception as the exposed situation in reception, control that is optimized for solving the exposed situation in transmission and the exposed situation in reception according to the present invention is performed, and wasteful control is performed, or rather, a decrease in a system capacity or a decrease in the communication quality due to the control occurs. Therefore, there is a need to take into consideration the congesting level in transmission or the congesting level in reception in terms of the judgment thresholds S and R that are to be used for the judgments in Examples 1 to 5 of the control procedure.

In the CSMA/CA scheme, because the collision avoidance is performed using the random backoff time, variations occur in the beacon signal transmission delay α or the beacon signal reception failure β with respect to the time axis. This applies to all the exposed situation in transmission, the congesting situation in transmission, the exposed situation in reception, and the congesting situation in reception and because of this, there is a need to take into consideration these temporal variations in the aggregation periods T1 and T2.

Figure 11:
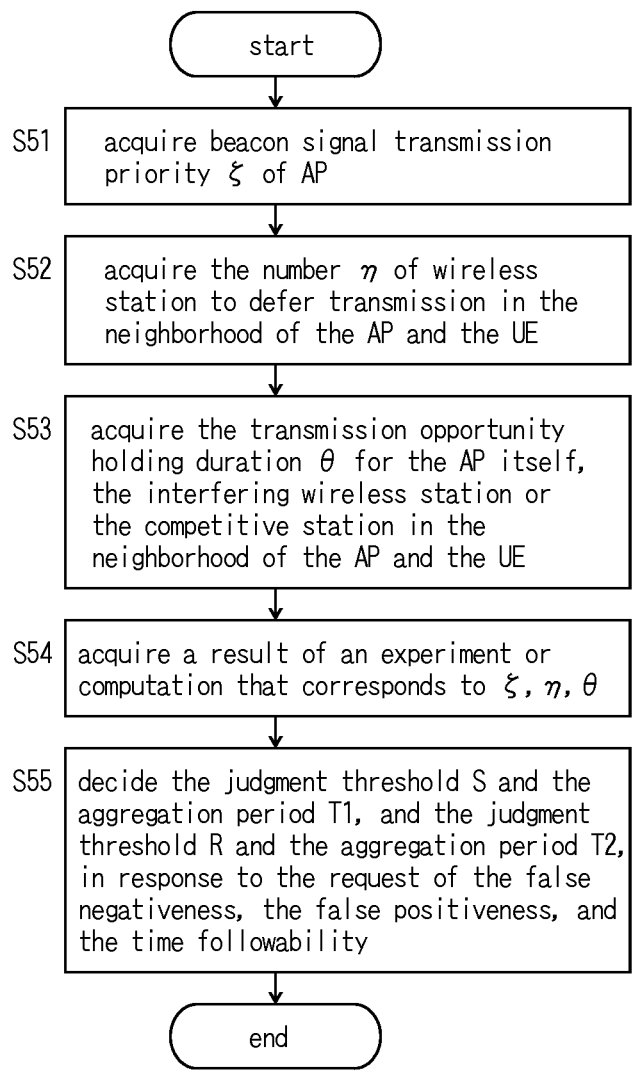
FIG. 11 is a flowchart illustrating an example of a procedure for calculating judgment thresholds S and R and aggregation periods T1 and T2.

FIG. 11 illustrates an example of the procedure for calculating the judgment thresholds S and R and the aggregation periods T1 and T2.

In FIG. 11, for the beacon signal transmission delay α and the beacon signal reception failure β, a magnitude of an influence that is exerted by the exposed level in transmission and the congesting level in transmission and a magnitude of an influence that is exerted by the exposed level in reception and the congesting level in reception change with transmission priority of the beacon signal (=beacon signal transmission priority ζ), and because of this, the beacon signal transmission priority ζ keeps acquired for each of the AP that makes a judgment of the exposed situation in transmission and the AP that transmits the beacon signal which is to be received in the UE that makes a judgment of the exposed situation in reception (S51). The beacon signal transmission priority ζ is acquired by using information that is included in the beacon signal or by inquiring of the AP or the wireless station management device 30.

Furthermore, in the congesting situation in transmission and the congesting situation in reception, when the number η of wireless stations subject to defer transmission increases, a probability that the AP will acquire a transmission opportunity decreases and a probability that a signal transmitted by the AP will cause collision in the UE increases. Because of this, the beacon signal transmission delay α and the beacon signal reception failure β increase. Therefore, for the calculation of the beacon signal transmission delay α and the beacon signal reception failure β in the congesting situation in transmission and the congesting situation in reception, the number η of wireless stations subject to defer transmission, in the neighborhood of the AP and the UE, is estimated (S52).

However, the beacon signal has high priority for transmission, and increasing levels of the beacon signal transmission delay α and the beacon signal reception failure β due to an increase in the number η of wireless stations subject to defer transmission are lower than those of the beacon signal transmission delay α and the beacon signal reception failure β at the exposed level in transmission and the exposed level in reception, which are increased to a certain degree or higher. Therefore, the number η of wireless stations subject to defer transmission may be set to the maximum number of wireless stations subject to defer transmission, which is maximized conceivably, and in a situation, such as one where the exposed level in transmission, which is increased to a certain degree or higher, and congestion in transmission are combined, or the exposed level in reception, which is increased to a certain degree or higher, and congestion in reception, are combined, an increase in the beacon signal transmission delay α or the beacon signal reception failure β due to the increase in the number of wireless stations η subject to defer transmission may be disregarded. It is noted that, when "transmission priority AC" of a signal of each of the wireless stations subject to defer transmission varies, a probability that the transmission opportunity will be acquired and a probability that the transmitted signal will cause collision change, and that because of this, the number η-AC of wireless stations subject to defer transmission for every transmission priority AC can keep acquired, thereby increasing the precision of the judgment. Furthermore, when the number of wireless stations subject to defer transmission varies in the neighborhood of the AP and the UE, the number η-AP of wireless stations subject to defer transmission in the neighborhood of the AP and the number η-UE of wireless stations subject to defer transmission in the neighborhood of the UE can keep acquired, thereby increasing the precision of judgment. It is noted that, when the UE waits for transmission of a signal destined for the AP, the UE is included in the wireless stations subject to deter transmission, of which the number is η.

The longer a transmission opportunity holding duration θ that is a time from when the AP itself, the interfering wireless station, and the competitive wireless station acquire a transmission opportunity one time to when the time for retaining the transmission opportunity expire is, the longer the beacon signal transmission delay α becomes, and the shorter the transmission opportunity holding duration θ is, the shorter the beacon signal transmission delay becomes.

Because of this, the transmission opportunity holding duration θ for the interfering wireless station or the competitive wireless station keeps acquired (S53).

It is noted that because the aggregation of the beacon signal transmission delay is performed in the aggregation period T1, instead of the transmission opportunity holding durations of one-by-one signals, the use of an average value or an expectation value does not pose any problem. It is possible that the average value or expectation value is calculated from information, that is, the transmission opportunity holding duration that is set to be in the AP or the UE in the system, from a measured value in the AP or the UE, from the transmission opportunity holding duration that is included in a signal, for example, a duration that is described in a duration field in a signal, in the IEEE 802.11 standard, and from information, such as an upper limit value of a transmission burst length that is determined in the CSMA/CA network. Furthermore, as with the number η of wireless stations subject to defer transmission, when the transmission opportunity holding durations for the interfering wireless station or the competitive wireless station in the AP and the UE are different, transmission opportunity holding durations θ-AP of the AP itself, the interfering wireless station in the neighborhood of the AP, and the competitive wireless station in the neighborhood of the AP, and transmission opportunity holding durations θ-UE of the AP itself which is a search target of the UE, the interfering wireless station in the neighborhood of the UE, and the competitive wireless station in the neighborhood of the UE, can keep acquired, thereby increasing the precision of the judgment. It is noted that when the UE waits for the transmission of the signal destined for the AP, the UE is also the competitive wireless station in the neighborhood of the AP and in the neighborhood of the UE.

Next, with a prior experiment or computation, or with computation at the time of the judgment, information relating to the required quality of the UE or the expected quality of the AP is acquired in conjunction with pieces of information, that is, the beacon signal transmission delay with respect to the time axis and the beacon signal reception failure (S54). For details, at the time of the judgment, a result of a prior experiment or prior computation that corresponds to the beacon signal transmission priority ζ that is input, the number η of the wireless stations subject to defer transmission, and the transmission opportunity holding duration θ is acquired, or pieces of information, that is, the beacon signal transmission priority ζ, the number η of the wireless stations subject to defer transmission, and the transmission opportunity holding duration θ, are input and computation is performed. Thus, information, that is, the beacon signal transmission delay with respect to the time axis or the beacon signal reception failure, and information relating to the required quality of the UE or the expected quality of the AP are acquired.

It is noted that the fact may be utilized that the beacon signal has high priority for transmission and that the beacon signal transmission delay α and the beacon signal reception failure β are influenced more greatly by the exposed level in transmission or the exposed level in reception than the congesting level in transmission or the congesting level in reception, and it is noted that, for the purpose of reducing an amount of retention or an amount of computation of the result of the experiment or the computation, experiment or computation of the exposure in transmission, the exposure in reception, and the congestion in transmission and the congestion in reception may be performed using simple topology models as illustrated in (1) of FIG. 1, (2) of FIG. 1, and (3) of FIG. 1, respectively.

With the result of the experiment or the result of the computation, to meet the demand for the false negativeness, the false positiveness, and the temporal followability, the judgment threshold S and the aggregation period T1 that result from considering the exposed level in transmission and the congesting level in transmission, and the judgment threshold R and the aggregation period T2 that result from considering the exposed level in reception and the congesting level in reception are decided (S55).

The results of the aggregation of the beacon signal transmission delay α and the beacon signal reception failure β under a situation where the exposed level in transmission or the exposed level in reception is increased and where the required quality of the UE or the expected quality of the AP cannot be satisfied are used for the decision of the judgment thresholds S and R, respectively, and, likewise, the results of the aggregation of the beacon signal transmission delay α and the beacon signal reception failure β in the congestion in transmission and the congestion in reception are also taken into consideration in deciding the judgment thresholds S and R, respectively.

An aggregation period in judgment is described. First, in order to prevent the congesting situation in transmission or the congesting situation in reception from being simply determined as the exposed situation in transmission or the exposed situation in reception, respectively, and thus to prevent controls in Examples 1 to 5 of the control procedure from being performed, there is a need to set the aggregation periods T1 and T2 in such a manner that the results of the aggregation of the beacon signal transmission delay α and the beacon signal reception failure β in the aggregation periods T1 and T2 at the congesting situation in transmission and congesting situation in reception, respectively, do not intersect the results of the aggregation of the beacon signal transmission delay α and the beacon signal reception failure β in the aggregation periods T1 and T2 at the exposed situation in transmission and the exposed situation in reception, respectively. It is noted that in the aggregation, for the beacon signal transmission delay α, in addition to the averaging in the aggregation period T1, any index may be used such as a maximum value or a ratio of beacon signals, the beacon signal transmission delay of each of which is at or above a fixed value. The following description is provided using a beacon signal transmission delay average value as an example. Furthermore, for the beacon signal reception failure β, in addition to a beacon signal reception failure rate (=the number of reception failures/(the number of normal receptions+the number of reception failures)) in the aggregation period T2, any indexes may be used such an average value or a maximum value of the number of successive times of beacon signal reception failure. The following description is provided using the beacon signal reception failure rate as an example.

Figure 12:
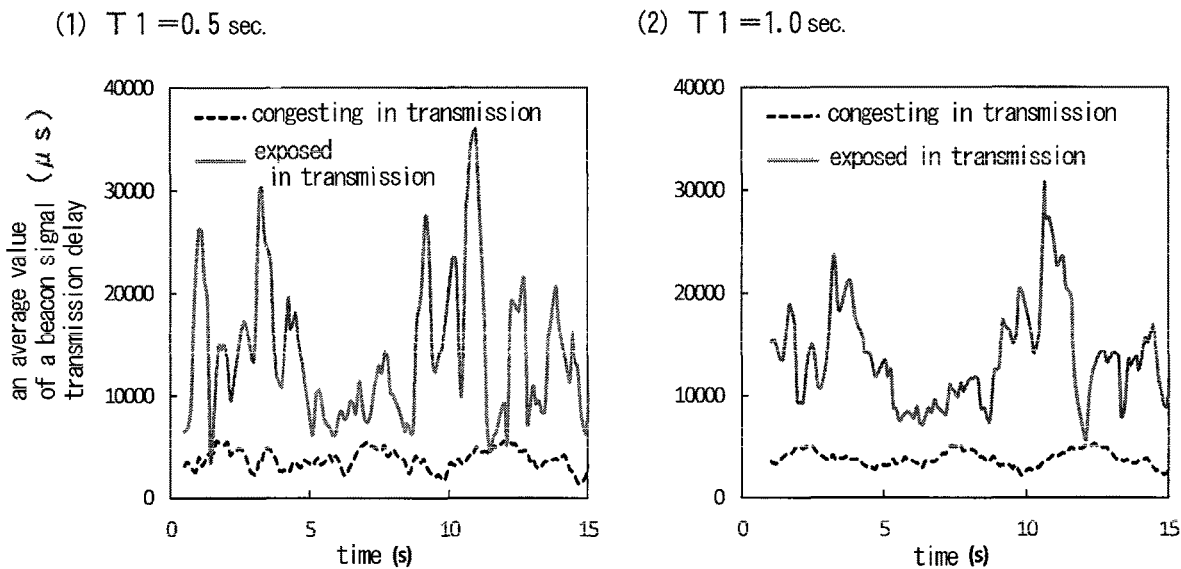
FIG. 12 is a diagram illustrating an example of decision of the judgment threshold S of a beacon signal transmission delay and the aggregation period T1.

FIG. 12 illustrates an example of decision of the judgment threshold S of the beacon signal transmission delay and the aggregation period T1. At this point, in a model in (1) of FIG. 1 and a mode in (3) of FIG. 1, the exposed situation in transmission, in which the number of interfering wireless stations is 2, and the congesting situation in transmission, in which the number of competitive wireless stations is 7, are assumed, and a result of an experiment for transition of an average value of a beacon signal transmission delay over time is shown. In an example in FIG. 12, because the minimum aggregation period T1 in which two lines do not intersect is one second, in this example, the aggregation period T1 is set to one second or longer.

Figure 13:
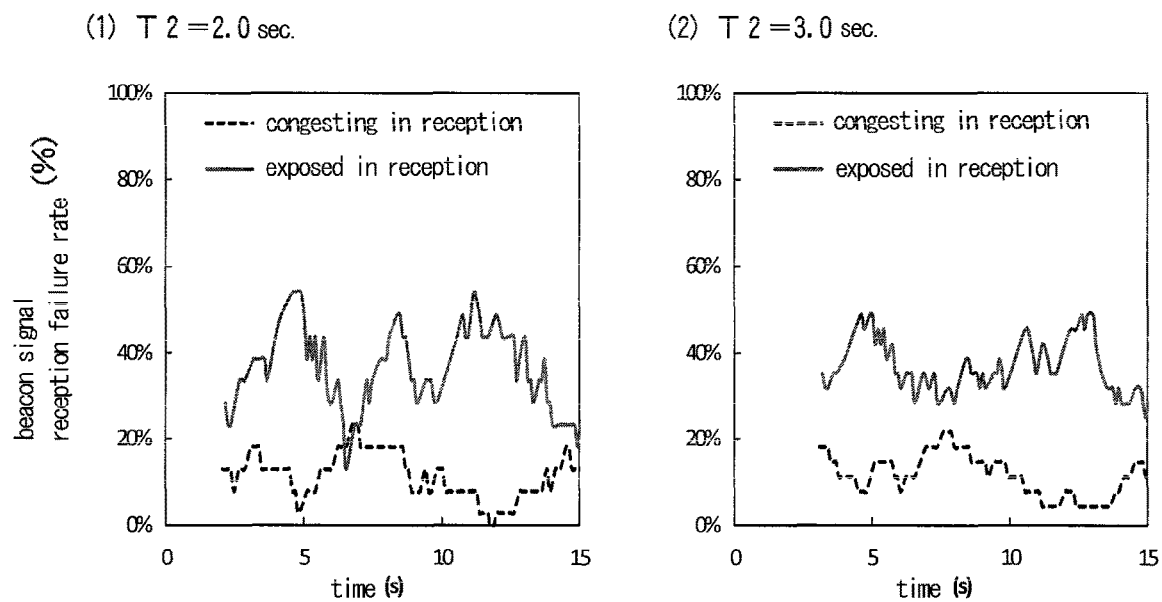
FIG. 13 is a diagram illustrating an example of decision of the judgment threshold R of a beacon signal transmission failure and the aggregation period T2.

FIG. 13 illustrates an example of decision of the judgment threshold R of the beacon signal reception failure and the aggregation period T2. At this point, in a model in (2) of FIG. 1 and the model in (3) of FIG. 1, the exposed situation in reception, in which the number of interfering wireless stations is 1, and the congesting situation in reception, in which the number of competitive wireless stations is 7, are assumed, and a result of an experiment for transition of the beacon signal reception failure rate over time is shown. In an example in FIG. 13, the minimum aggregation period T2 in which two lines do not intersect is three seconds, and in this example, the aggregation period T2 is set to three seconds or longer.

Furthermore, because the control according to the present invention is based on two values, one at which the expected quality of the AP or the required quality of the UE cannot be satisfied and one at which the expected quality of the AP or the required quality of the UE can be satisfied, there is a likelihood that the following four patterns will occur.

True Positiveness: Judgment of a state where the quality cannot be actually satisfied as a state where the quality cannot be satisfied False Negativeness: Judgment of the state where the quality cannot be actually satisfied as a state where the quality can be satisfied False Positiveness: Judgment of a state where the quality can be actually satisfied as the state where the quality cannot be satisfied True Negativeness: Judgment of the state where the quality can be actually satisfied as the state where the quality can be satisfied Because of this, there is a need to decide the judgment thresholds S and R, and the aggregation periods T1 and T2, taking into consideration the following three items relating to the precision of the judgment.

(1) False Negativeness:

When the judgment thresholds S and R are not minimum values in changes in the beacon signal transmission delay average value and the beacon signal reception failure rate over time in the aggregation periods T1 and T2, respectively, there is a false-negativeness probability that the AP or the UE which cannot satisfy the quality will be judged as being able to satisfy the quality, and the higher the judgment thresholds S and R are, the higher this probability is. Therefore, there is a probability that control which improves the state where the quality cannot be satisfied will not be performed, so that a decrease in the communication quality continues, or when the quality can be satisfied, if the control is performed, for example, there is a probability that the CSMA/CA network of which quality cannot be satisfied will be used for derivation of a connection candidate AP in Example 2 of the control procedure.

(2) False Positiveness:

In a case where the judgment thresholds S and R are not maximum values in changes in the beacon signal transmission delay average value and the beacon signal reception failure rate over time in the aggregation periods T1 and T2, respectively, there is a false-positiveness probability that the AP or the UE that can satisfy the quality will be judged as not being able to satisfy the quality, the lower the judgment thresholds S and R are, the higher this probability is. Therefore, there is a probability that the control will be performed regardless of the fact that the quality can be satisfied, where the utilization rate of the CSMA/CA network or the system capacity decreases, or when the quality can be satisfied, if the control is performed, for example, there is a probability that the CSMA/CA network of which quality can be satisfied will not be used for the derivation of the connection candidate AP in Example 2 of the control procedure.

(3) Temporal Follwability:

When the aggregation periods T1 and T2 are extended, the changes in the beacon signal transmission delay average value and the beacon signal reception failure rate over time are suppressed, the minimum value and the maximum value that are described above in (1) and (2) are the same value, and it is possible that the false negativeness or the false positiveness is reduced. However, in this case, with the long aggregation periods T1 and T2, the time in which it can be judged that the quality cannot be satisfied or can be satisfied is lengthened, and the longer the aggregation periods T1 and T2 are, the longer response time to an environmental change be needed, or the temporal follwability is degraded in such a manner that temporal resolution of the environmental change deteriorates.

The many features and advantages of the embodiments are apparent from the detailed specification and, thus, it is intended by the appended claims to cover all such features and advantafes of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system in which an access point (AP) and user equipment (UE), which perform access control using CSMA/CA, judge an exposed situation in transmission of the AP and an exposed situation in reception of the UE that are due to an influence of a hidden station, and perform control which avoids the influence of the hidden station, based on a result of the judgment, the system comprising:

a judgment section configured to judge an exposed level in transmission of the AP which is based on a congesting level in transmission, which is caused by a wireless station in defer transmission that is in a neighborhood of the AP, and judge an exposed level in reception of the UE which is based on a congesting level in reception, which is caused by a wireless station in defer transmission that is in a neighborhood of the UE; and a control section configured to perform one of control which changes a connected AP of the UE and control which changes to other network, when the exposed level in transmission or the exposed level in reception cannot satisfy required quality of the UE;

wherein the judgment section is configured to make one of a judgment of the exposed level in transmission of the AP which is based on the congesting level in transmission and a judgment of the exposed level in reception of the UE which is based on the congesting level in reception, using a result of aggregation obtained by aggregating an index in a prescribed period and using a judgment threshold.

2. The wireless communication system according to claim 1, wherein when the exposed level in transmission of the AP can satisfy the required quality of the UE and the exposed level in reception of the UE that is connected to the AP can satisfy the required quality of the UE, the control section is configured to perform control which sets the AP to be a connection destination.

3. The wireless communication system according to claim 1, wherein
the judgment section is configured to judge the exposed level in reception of the UE, including the exposed level in transmission of the AP which is based on the congesting level in transmission of the AP.

4. A wireless communication system in which an access point (AP) and user equipment (UE), which perform access control using CSMA/CA, judge an exposed situation in transmission of the AP and an exposed situation in reception of the UE that are due to an influence of a hidden station, and perform control which avoids the influence of the hidden station, based on a result of the judgment, the system comprising:
a judgment section configured to judge an exposed level in transmission of the AP which is based on a congesting level in transmission, which is caused by a wireless station in defer transmission that is in a neighborhood of the AP; and
a control section configured to perform control which changes a channel of the AP, when the exposed level in transmission cannot satisfy expected quality of the AP;
wherein the judgment section is configured to make a judgment of the exposed level in transmission of the AP which is based on the congesting level in transmission, using a result of aggregation obtained by aggregating an index in a prescribed period and using a judgment threshold.

5. The wireless communication system according to claim 4, wherein
the judgment section is configured to judge the exposed level in reception of the UE, including the exposed level in transmission of the AP which is based on the congesting level in transmission of the AP.

6. A wireless communication system in which an access point (AP) and user equipment (UE), which perform access control using CSMA/CA, judge an exposed situation in transmission of the AP and an exposed situation in reception of the UE that are due to an influence of a hidden station, and perform control which avoids the influence of the hidden station, based on a result of the judgment, the system comprising:
a judgment section configured to judge an exposed level in reception of the UE which is based on a congesting level in reception, which is caused by a wireless station in defer transmission that is in a neighborhood of the UE; and
a control section configured to perform one of control which changes a connected AP of the UE and control which changes to other network, when the exposed level in reception cannot satisfy expected quality of the AP;
wherein the judgment section is configured to make a judgment of the exposed level in reception of the UE which is based on the congesting level in reception, using a result of aggregation obtained by aggregating an index in a prescribed period and using a judgment threshold.

7. A wireless communication system in which an access point (AP) and user equipment (UE), which perform access control using CSMA/CA, judge an exposed situation in transmission of the AP and an exposed situation in reception of the UE that are due to an influence of a hidden station, and perform control which avoids the influence of the hidden station, based on a result of the judgment, the system comprising:
a judgment section configured to judge an exposed level in transmission of the AP which is based on a congesting level in transmission, which is caused by a wireless station in defer transmission that is in a neighborhood of the AP, and judge an exposed level in reception of the UE which is based on a congesting level in reception, which is caused by a wireless station in defer transmission that is in a neighborhood of the UE; and
a control section configured to perform control which changes a channel of the AP, when the exposed level in transmission cannot satisfy expected quality of the AP, and performing one of control which changes a connected AP of the UE and control which changes to other network, when the exposed level in reception cannot satisfy the expected quality of the AP;
wherein the judgment section is configured to make one of a judgment of the exposed level in transmission of the AP which is based on the congesting level in transmission and a judgment of the exposed level in reception of the UE which is based on the congesting level in reception, using a result of aggregation obtained by aggregating an index in a prescribed period and using a judgment threshold.

8. The wireless communication system according to claim 7, wherein
the judgment section is configured to judge the exposed level in reception of the UE, including the exposed level in transmission of the AP which is based on the congesting level in transmission of the AP.

9. A wireless communication control method in which an access point (AP) and user equipment (UE), which perform access control using CSMA/CA, judge an exposed situation in transmission of the AP and an exposed situation in reception of the UE that are due to an influence of a hidden station, and perform control which avoids the influence of the hidden station, based on a result of the judgment, the method comprising:
judging an exposed level in transmission of the AP which is based on a congesting level in transmission, which is caused by a wireless station in defer transmission that is in a neighborhood of the AP, using a result of aggregation obtained by aggregating an index in a prescribed period and using a judgment threshold;
judging an exposed level in reception of the UE which is based on a congesting level in reception, which is caused by a wireless station in defer transmission that is in a neighborhood of the UE; and
performing control which changes a channel of the AP, when the exposed level in transmission cannot satisfy expected quality of the AP, and
performing one of control which changes a connected AP of the UE and control which changes to other network, when the exposed level in transmission or the exposed level in reception cannot satisfy one of required quality of the UE and the expected quality of the AP.

* * * * *